US011425562B2

(12) United States Patent
LeCun et al.

(10) Patent No.: US 11,425,562 B2
(45) Date of Patent: Aug. 23, 2022

(54) METHODS, SYSTEMS, AND MEDIA FOR DETECTING SPOOFING IN MOBILE AUTHENTICATION

(71) Applicant: Element Inc., New York, NY (US)

(72) Inventors: Yann LeCun, New York, NY (US); Fengjun Lv, Plainsboro, NJ (US); Dushyant Goyal, Jersey City, NJ (US); Yang Wang, Princeton, NJ (US); Adam Perold, New York, NY (US)

(73) Assignee: Element Inc.

( * ) Notice: Subject to any disclaimer, the term of this patent is extended or adjusted under 35 U.S.C. 154(b) by 0 days.

(21) Appl. No.: 16/893,279

(22) Filed: Jun. 4, 2020

(65) Prior Publication Data
US 2020/0304997 A1   Sep. 24, 2020

Related U.S. Application Data

(63) Continuation of application No. 16/134,781, filed on Sep. 18, 2018, now Pat. No. 10,735,959.
(Continued)

(51) Int. Cl.
*H04W 12/06* (2021.01)
*H04N 19/46* (2014.01)
(Continued)

(52) U.S. Cl.
CPC .......... *H04W 12/06* (2013.01); *G06V 10/145* (2022.01); *G06V 10/50* (2022.01); *G06V 20/46* (2022.01);
(Continued)

(58) Field of Classification Search
CPC ... H04W 12/06; H04N 19/117; H04N 19/184; H04N 19/46; H04N 19/52; H04N 19/523;
(Continued)

(56) References Cited

U.S. PATENT DOCUMENTS 3,733,861 A   5/1973   Lester
4,371,951 A   2/1983   Kort et al.
(Continued)

FOREIGN PATENT DOCUMENTS

AU   2015218542 A1   3/2016
CA      2902093 A1   2/2016
(Continued)

OTHER PUBLICATIONS

Boult et al.: Revocable fingerprint biotokens: Accuracy and security analysis. 2007 IEEE Conference on Computer Vision and Pattern Recognition, 2007, 8 pages.
(Continued)

*Primary Examiner* — Inder P Mehra
(74) *Attorney, Agent, or Firm* — Wilson Sonsini Goodrich & Rosati

(57) ABSTRACT

Provided herein are devices, systems, and methods for detecting spoofing of a 3D object, using a 2D representation, in a mobile object authentication process, comprising capturing image data of the 3D object by a front-facing camera, to record a current spatial characteristic of the 3D object, while a front-facing screen displays an authentication pattern comprising a plurality of regions, wherein at least one of the regions varies in at least one of: brightness, position, size, shape, and color over time causing a variance of lighting effects which create highlights and shadows on the 3D object over time. The devices, systems, and methods thereby provide an efficient and secure process for determining if spoofing of the 3D object, using a 2D representation, is attempted in a mobile authentication process, by comparing the current spatial characteristic of the 3D object with a stored reference spatial characteristic of the 3D object.

19 Claims, 10 Drawing Sheets

Related U.S. Application Data

(60) Provisional application No. 62/560,038, filed on Sep. 18, 2017.

(51) Int. Cl.

| | | |
|---|---|---|
| *H04N 19/91* | (2014.01) | |
| *H04N 19/117* | (2014.01) | |
| *H04N 19/573* | (2014.01) | |
| *H04N 19/52* | (2014.01) | |
| *H04N 19/70* | (2014.01) | |
| *H04N 19/184* | (2014.01) | |
| *H04N 19/523* | (2014.01) | |
| *H04L 29/06* | (2006.01) | |
| *G06K 9/00* | (2022.01) | |
| *G06K 9/20* | (2006.01) | |
| *G06K 9/46* | (2006.01) | |
| *H04L 9/40* | (2022.01) | |
| *G06V 10/50* | (2022.01) | |
| *G06V 10/145* | (2022.01) | |
| *G06V 20/40* | (2022.01) | |
| *G06V 40/40* | (2022.01) | |
| *G06V 40/60* | (2022.01) | |
| *G06V 20/64* | (2022.01) | |
| *G06V 40/13* | (2022.01) | |
| *G06V 40/16* | (2022.01) | |

(52) U.S. Cl.
CPC .............. *G06V 40/40* (2022.01); *G06V 40/67* (2022.01); *H04L 63/0861* (2013.01); *H04N 19/117* (2014.11); *H04N 19/184* (2014.11); *H04N 19/46* (2014.11); *H04N 19/52* (2014.11); *H04N 19/523* (2014.11); *H04N 19/573* (2014.11); *H04N 19/70* (2014.11); *H04N 19/91* (2014.11); *G06V 20/647* (2022.01); *G06V 40/13* (2022.01); *G06V 40/166* (2022.01)

(58) Field of Classification Search
CPC ...... H04N 19/573; H04N 19/70; H04N 19/91; G06K 9/00744; G06K 9/00899; G06K 9/00912; G06K 9/2036; G06K 9/4642; G06K 9/00013; G06K 9/00208; G06K 9/00255; G06K 9/2027; G06K 9/00201; H04L 63/0861
USPC ........................................................ 455/411
See application file for complete search history.

(56) References Cited

U.S. PATENT DOCUMENTS

| | | |
|---|---|---|
| 5,067,164 A | 9/1991 | Denker et al. |
| 5,058,179 A | 10/1991 | Denker et al. |
| 5,450,523 A | 9/1995 | Zhao |
| 5,774,059 A | 6/1998 | Henry et al. |
| 5,867,802 A | 2/1999 | Borza |
| 6,152,563 A | 11/2000 | Hutchinson et al. |
| 6,274,745 B1 | 8/2001 | Inanaga et al. |
| 6,628,813 B2 | 9/2003 | Scott et al. |
| 6,633,090 B2 | 10/2003 | Harter et al. |
| 6,873,714 B2 | 3/2005 | Witt et al. |
| 6,923,370 B2 | 8/2005 | Gotfried et al. |
| 6,956,608 B1 | 10/2005 | Shapiro et al. |
| 6,992,562 B2 | 1/2006 | Fuks et al. |
| 7,158,097 B2 | 1/2007 | Taylor et al. |
| 7,218,761 B2 | 5/2007 | McClurg et al. |
| 7,317,815 B2 | 1/2008 | Steinberg et al. |
| 7,346,195 B2 | 3/2008 | Lauper et al. |
| 7,630,524 B2 | 12/2009 | Lauper et al. |
| 7,660,442 B2 | 2/2010 | Sweeney et al. |
| 7,986,816 B1 | 7/2011 | Hoanca et al. |
| 8,026,840 B2 | 9/2011 | Dwelly et al. |
| 8,064,645 B1 | 11/2011 | Sezille |
| 8,160,307 B2 | 4/2012 | Polcha et al. |
| 8,194,938 B2 | 6/2012 | Wechsler et al. |
| 8,235,529 B1 | 8/2012 | Raffle et al. |
| 8,290,220 B2 | 10/2012 | Uchida |
| 8,396,265 B1 | 3/2013 | Ross et al. |
| 8,437,513 B1 | 5/2013 | Derakhshani et al. |
| 8,472,681 B2 | 6/2013 | Hamza |
| 8,506,080 B2 | 8/2013 | Raffle et al. |
| 8,542,879 B1 | 9/2013 | Nechyba et al. |
| 8,638,939 B1 | 1/2014 | Casey et al. |
| 8,856,541 B1 | 10/2014 | Chaudhury et al. |
| 8,939,584 B2 | 1/2015 | Raffle et al. |
| 8,965,287 B2 | 2/2015 | Lam |
| 9,002,586 B2 | 4/2015 | Feit |
| 9,003,196 B2 | 4/2015 | Hoyos et al. |
| 9,042,609 B2 | 5/2015 | Todoroki |
| 9,053,545 B2 | 6/2015 | Steinberg et al. |
| 9,081,947 B2 | 7/2015 | Dewan et al. |
| 9,104,921 B2 | 8/2015 | Derakhshani et al. |
| 9,111,402 B1 | 8/2015 | Krishnan et al. |
| 9,244,529 B2 | 1/2016 | Model |
| 9,355,612 B1 | 5/2016 | Shepard et al. |
| D763,872 S | 8/2016 | Tussy |
| 9,519,769 B2 | 12/2016 | Azar et al. |
| 9,641,523 B2 | 5/2017 | Langley et al. |
| 9,652,663 B2 | 5/2017 | Lau et al. |
| D813,264 S | 3/2018 | Tussy |
| 9,913,135 B2 | 3/2018 | Perold et al. |
| 9,953,149 B2 | 4/2018 | Tussy |
| 9,965,728 B2 | 5/2018 | Perold |
| 9,971,920 B2 | 5/2018 | Derakhshani et al. |
| 10,063,560 B2 | 8/2018 | Gordon et al. |
| 10,094,655 B2 | 10/2018 | Sabitov et al. |
| 10,102,358 B2 | 10/2018 | Wilder |
| 10,135,815 B2 | 11/2018 | LeCun et al. |
| 10,192,109 B2 | 1/2019 | Skogo et al. |
| 10,410,076 B2 | 9/2019 | Van et al. |
| 10,482,230 B2 | 11/2019 | Wilder |
| 10,515,262 B2 | 12/2019 | Morishita |
| 10,528,849 B2 | 1/2020 | Fan et al. |
| 10,733,275 B1 | 8/2020 | Knas et al. |
| 10,735,959 B2 | 8/2020 | LeCun et al. |
| 2003/0091215 A1 | 5/2003 | Lauper et al. |
| 2003/0156742 A1 | 8/2003 | Witt et al. |
| 2004/0017934 A1 | 1/2004 | Kocher |
| 2004/0075645 A1 | 4/2004 | Taylor et al. |
| 2005/0117784 A1 | 6/2005 | Merbach et al. |
| 2006/0120568 A1 | 6/2006 | McConville et al. |
| 2006/0294393 A1 | 12/2006 | Mc |
| 2007/0113099 A1 | 5/2007 | Takikawa et al. |
| 2008/0000286 A1 | 1/2008 | Strohmaier et al. |
| 2008/0002860 A1 | 1/2008 | Super et al. |
| 2008/0056539 A1 | 3/2008 | Sweeney et al. |
| 2008/0091952 A1 | 4/2008 | Sumner et al. |
| 2008/0137916 A1 | 6/2008 | Lauper et al. |
| 2008/0263681 A1 | 10/2008 | Dooms et al. |
| 2008/0284726 A1 | 11/2008 | Boillot |
| 2008/0296364 A1 | 12/2008 | Pappas et al. |
| 2009/0001160 A1 | 1/2009 | Davis et al. |
| 2009/0092294 A1 | 4/2009 | Uchida |
| 2009/0175506 A1 | 7/2009 | Polcha et al. |
| 2009/0185726 A1 | 7/2009 | Higuchi |
| 2009/0202114 A1 | 8/2009 | Morin et al. |
| 2009/0249478 A1 | 10/2009 | Rosener et al. |
| 2009/0297032 A1 | 12/2009 | Loui et al. |
| 2010/0030698 A1 | 2/2010 | Goodin |
| 2010/0042940 A1 | 2/2010 | Monday et al. |
| 2010/0046830 A1 | 2/2010 | Wang et al. |
| 2010/0127827 A1 | 5/2010 | Watanabe |
| 2010/0128936 A1 | 5/2010 | Baughman |
| 2010/0148923 A1 | 6/2010 | Takizawa |
| 2010/0191551 A1 | 7/2010 | Drance et al. |
| 2010/0246902 A1 | 9/2010 | Rowe et al. |
| 2010/0316263 A1 | 12/2010 | Hamza |
| 2011/0119734 A1 | 5/2011 | Crawford et al. |
| 2011/0135166 A1 | 6/2011 | Wechsler et al. |
| 2011/0229045 A1 | 9/2011 | Yu |

(56) References Cited

U.S. PATENT DOCUMENTS

| | | |
|---|---|---|
| 2011/0254942 A1 | 10/2011 | Suzuki |
| 2011/0270712 A1 | 11/2011 | Wood et al. |
| 2011/0317872 A1 | 12/2011 | Free |
| 2012/0046862 A1 | 2/2012 | Griffin et al. |
| 2012/0128936 A1 | 5/2012 | Imajima et al. |
| 2012/0137137 A1 | 5/2012 | Brickell et al. |
| 2012/0162385 A1 | 6/2012 | Park et al. |
| 2012/0218936 A1 | 8/2012 | Fleeman et al. |
| 2012/0288166 A1 | 11/2012 | Sun et al. |
| 2013/0015946 A1 | 1/2013 | Lau et al. |
| 2013/0099892 A1 | 4/2013 | Tucker et al. |
| 2013/0135204 A1 | 5/2013 | Raffle et al. |
| 2013/0222835 A1 | 8/2013 | Iwamoto et al. |
| 2013/0227651 A1 | 8/2013 | Schultz et al. |
| 2013/0268418 A1 | 10/2013 | Sardi et al. |
| 2013/0275309 A1 | 10/2013 | Kwong |
| 2013/0286161 A1 | 10/2013 | Lv et al. |
| 2013/0290154 A1 | 10/2013 | Cherry et al. |
| 2013/0294642 A1 | 11/2013 | Wang et al. |
| 2013/0300652 A1 | 11/2013 | Raffle et al. |
| 2013/0311866 A1 | 11/2013 | Herold |
| 2013/0342672 A1 | 12/2013 | Gray et al. |
| 2014/0013252 A1 | 1/2014 | Ehrler et al. |
| 2014/0037134 A1 | 2/2014 | Tong et al. |
| 2014/0068740 A1* | 3/2014 | LeCun .................. G06F 21/32 726/7 |
| 2014/0072185 A1 | 3/2014 | Dunlap et al. |
| 2014/0165187 A1 | 6/2014 | Daesung et al. |
| 2014/0195974 A1 | 7/2014 | Ballard et al. |
| 2014/0211995 A1 | 7/2014 | Model |
| 2014/0294257 A1 | 10/2014 | Tussy |
| 2014/0351163 A1 | 11/2014 | Tussy |
| 2014/0366113 A1 | 12/2014 | LeCun et al. |
| 2015/0010145 A1 | 1/2015 | Iwashita et al. |
| 2015/0039892 A1 | 2/2015 | Fujita et al. |
| 2015/0055841 A1 | 2/2015 | Xiao et al. |
| 2015/0193666 A1 | 7/2015 | Derakhshani et al. |
| 2015/0227735 A1 | 8/2015 | Chappell |
| 2015/0227780 A1 | 8/2015 | Tussy |
| 2015/0256740 A1 | 9/2015 | Kalama |
| 2015/0310259 A1 | 10/2015 | Lau et al. |
| 2015/0334562 A1 | 11/2015 | Perold et al. |
| 2015/0334567 A1 | 11/2015 | Chen et al. |
| 2015/0347833 A1 | 12/2015 | Robinson et al. |
| 2015/0348214 A1 | 12/2015 | Jain |
| 2015/0350225 A1 | 12/2015 | Perold et al. |
| 2016/0037155 A1 | 2/2016 | Yoshino et al. |
| 2016/0044029 A1 | 2/2016 | Langley et al. |
| 2016/0062456 A1 | 3/2016 | Wang et al. |
| 2016/0063314 A1 | 3/2016 | Samet |
| 2016/0132735 A1 | 5/2016 | Derakhshani et al. |
| 2016/0182506 A1 | 6/2016 | Hoyos |
| 2016/0283710 A1 | 9/2016 | Kwon et al. |
| 2016/0307038 A1 | 10/2016 | Skogo et al. |
| 2016/0335483 A1 | 11/2016 | Pfursich et al. |
| 2016/0371555 A1* | 12/2016 | Derakhshani ........... G01S 15/89 |
| 2017/0053175 A1 | 2/2017 | Tussy |
| 2017/0061251 A1 | 3/2017 | Fan et al. |
| 2017/0064062 A1 | 3/2017 | Lee et al. |
| 2017/0109513 A1 | 4/2017 | Skogo et al. |
| 2017/0124385 A1* | 5/2017 | Ganong .................. G06F 16/50 |
| 2017/0185760 A1 | 6/2017 | Wilder |
| 2017/0186170 A1 | 6/2017 | Nugraha et al. |
| 2017/0193285 A1 | 7/2017 | Negi et al. |
| 2017/0228586 A1 | 8/2017 | Morishita |
| 2017/0304732 A1 | 10/2017 | Velio et al. |
| 2017/0318019 A1 | 11/2017 | Gordon et al. |
| 2017/0351929 A1 | 12/2017 | Kim |
| 2018/0012070 A1 | 1/2018 | Shin et al. |
| 2018/0068173 A1 | 3/2018 | Kolleri |
| 2018/0181737 A1 | 6/2018 | Tussy |
| 2018/0189960 A1 | 7/2018 | Martin |
| 2018/0196930 A1 | 7/2018 | Ahuja et al. |
| 2018/0218139 A1 | 8/2018 | Tussy |
| 2018/0253152 A1 | 9/2018 | Forsblom et al. |
| 2018/0260643 A1 | 9/2018 | Sheikh Faridul et al. |
| 2019/0005222 A1 | 1/2019 | Wilder |
| 2019/0080072 A1 | 3/2019 | Van Os et al. |
| 2019/0102608 A1 | 4/2019 | Wang et al. |
| 2019/0213311 A1 | 7/2019 | Tussy |
| 2019/0213312 A1 | 7/2019 | Tussy |
| 2019/0303551 A1* | 10/2019 | Tussy ..................... G06F 21/34 |
| 2019/0311102 A1 | 10/2019 | Tussy |
| 2020/0042685 A1 | 2/2020 | Tussy et al. |
| 2020/0296132 A1 | 9/2020 | Lv et al. |
| 2020/0309930 A1 | 10/2020 | Zhou et al. |
| 2020/0320282 A1 | 10/2020 | Boic |
| 2021/0182553 A1 | 6/2021 | Lv et al. |
| 2021/0334570 A1 | 10/2021 | Hamid et al. |

FOREIGN PATENT DOCUMENTS

| | | |
|---|---|---|
| CN | 102426715 A | 4/2012 |
| CN | 105389491 A | 3/2016 |
| EP | 0049039 A1 | 4/1982 |
| EP | 0049039 B1 | 7/1984 |
| EP | 2192526 A2 | 6/2010 |
| EP | 2993619 A1 | 3/2016 |
| JP | H10177650 A | 6/1998 |
| JP | 2002032343 A | 1/2002 |
| JP | 2002207705 A | 7/2002 |
| JP | 2002259345 A | 9/2002 |
| JP | 2003148017 A | 5/2003 |
| JP | 2003178306 A | 6/2003 |
| JP | 2006259923 A | 9/2006 |
| JP | 2008242631 A | 10/2008 |
| JP | 2009017516 A | 1/2009 |
| JP | 2010128822 A | 6/2010 |
| JP | 2010146502 A | 7/2010 |
| JP | 2010177650 A | 8/2010 |
| JP | 2016051482 A | 4/2016 |
| JP | 2018200716 A | 12/2018 |
| KR | 20160026791 A | 3/2016 |
| TW | 201327413 A | 7/2013 |
| TW | 201814572 A | 4/2018 |
| TW | I664552 B | 7/2019 |
| WO | WO-0188857 A1 | 11/2001 |
| WO | WO-2004072899 A1 | 8/2004 |
| WO | WO-2007000504 A1 | 1/2007 |
| WO | WO-2007099834 A1 | 9/2007 |
| WO | WO-2009013526 A1 | 1/2009 |
| WO | WO-2012020591 A1 | 2/2012 |
| WO | WO-2013081673 A1 | 6/2013 |
| WO | WO-2014004584 A2 | 1/2014 |
| WO | WO-2014039732 A2 | 3/2014 |
| WO | WO-2014184436 A1 | 11/2014 |
| WO | WO-2015175670 A1 | 11/2015 |
| WO | WO-2015187882 A1 | 12/2015 |
| WO | WO-2016059786 A1 | 4/2016 |
| WO | WO-2016168814 A1 | 10/2016 |
| WO | WO-2017189935 A1 | 11/2017 |
| WO | WO-2018125563 A1 | 7/2018 |
| WO | WO-2019151368 A1 | 8/2019 |
| WO | WO-2020185948 A1 | 9/2020 |
| WO | WO-2021126825 A1 | 6/2021 |

OTHER PUBLICATIONS

Boureau et al.: A theoretical analysis of feature pooling in visual recognition. Proceedings of the 27th International Conference on Machine Learning. 2010; 111-118.

Cortes et al.: Support-vector networks. Machine Learning. 1995; 20:273-297.

Dalal et al.: Histograms of oriented gradients for human detection. Proceedings of the 2005 IEEE Computer Society Conference on Computer Vision and Pattern Recognition. 2005; 1:886-893.

Han et al.: Palmprint recognition based on directional features and graph matching. Advances in Biometrics: ICB 2007, 4642:1164-1173, 2007.

International Application No. PCT/US2018/051559 International Search Report and Written Opinion dated Nov. 30, 2018.

Lecun et al.: Convolutional networks and applications in vision.

(56) References Cited

OTHER PUBLICATIONS

Proceedings of IEEE International Symposium on Circuits and Systems. 2010; 253-256.
Lecun et al.: Gradient-based learning applied to document recognition. Proceedings of the IEEE. Nov. 1998; 86(11):2278-2324.
Lowe, D.: Distinctive image features from scale-invariant keypoints. International Journal of Computer Vision. 2004; 60(2):91-110.
Media filter. From Wikipedia, the free encyclopedia. Downloaded from the internet https://en.wikipedia.org/w/index.php?title=Median_filter&olded=489380290. Downloaded on Mar. 10, 2016, 4 pages.
PCT/US2013/058343 International Preliminary Report on Patentability dated Mar. 19, 2015.
PCT/US2013/058343 International search report dated Mar. 13, 2014.
PCT/US2015/030586 International Preliminary Report on Patentability dated Nov. 24, 2016.
PCT/US2015/030586 International Search Report and Written Opinion dated Aug. 20, 2015.
PCT/US2015/034077 International Preliminary Report on Patentability dated Dec. 15, 2016.
PCT/US2015/034077 International Search Report and Written Opinion dated Sep. 30, 2015.
PCT/US2018/051559 International Preliminary Report on Patentability dated Mar. 24, 2020.
PCT/US2020/022168 International Search Report and Written Opinion dated Jun. 3, 2020.
Rokita et al.: Cell Phones Personal Authentication Systems Using Multimodal Biometrics. ICIAR:25-27 (2008).
Sermanet et al.: Pedestrian detection with unsupervised multi-stage feature learning. Proceedings of the IEEE Conference on Computer Vision and Pattern Recognition. Jun. 2013; 3626-3633.
U.S. Appl. No. 14/019,512 Office Action dated Nov. 6, 2014.
U.S. Appl. No. 14/449,730 Final Office Action dated Apr. 30, 2015.
U.S. Appl. No. 14/449,730 Office Action dated Nov. 18, 2014.
U.S. Appl. No. 14/449,730 Office Action dated Mar. 31, 2016.
U.S. Appl. No. 14/449,730 Office Action dated May 30, 2017.
U.S. Appl. No. 14/449,730 Office Action dated Oct. 18, 2017.
U.S. Appl. No. 14/449,730 Office Action dated Sep. 14, 2016.
U.S. Appl. No. 14/711,664 Office Action dated Apr. 7, 2017.
U.S. Appl. No. 14/711,664 Office Action dated Sep. 30, 2016.
U.S. Appl. No. 14/730,166 Office Action dated Feb. 28, 2017.
U.S. Appl. No. 14/730,166 Office Action dated Jul. 13, 2017.
U.S. Appl. No. 14/730,166 Office Action dated Sep. 29, 2016.
U.S. Appl. No. 16/134,781 Office Action dated Mar. 21, 2019.
U.S. Appl. No. 16/153,412 Office Action dated Nov. 18, 2019.
Viola et al.: Rapid object detection using a boosted cascade of simple features. Proceedings of the 2001 IEEE Computer Society Conference on Computer Vision and Pattern Recognition. 2001; 1:I-511-I-518.
PCT/US2020/065070 International Search Report and Written Opinion dated Mar. 19, 2021.
Smith et al.: Face recognition on consumer devices: reflections on replay attacks. IEE Transactions on Information Forensics and Security 10(4):736-745 (2015).
U.S. Appl. No. 17/121,587 Office Action dated Jan. 5, 2022.
Japanese Patent Application No. 2020-515984 First Office Action dated Feb. 6, 2022.

\* cited by examiner

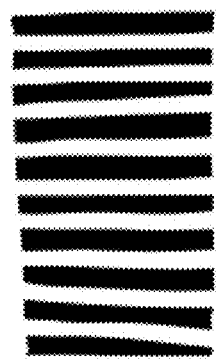 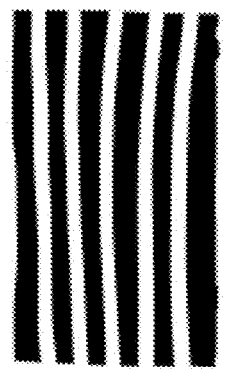
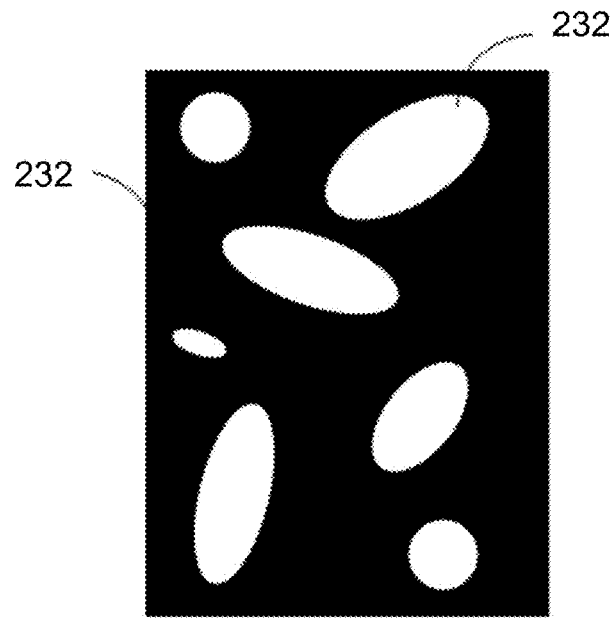
Fig. 2G
Fig. 2H
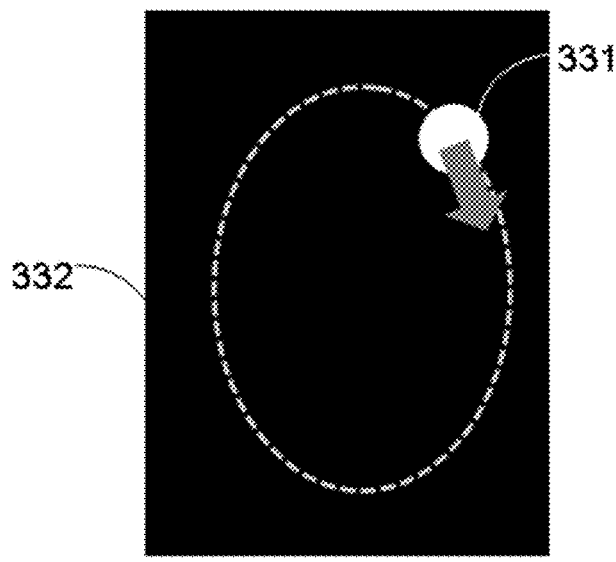
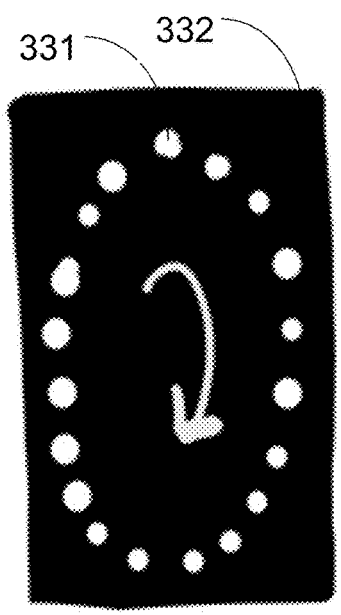
Fig. 3A
Fig. 3B

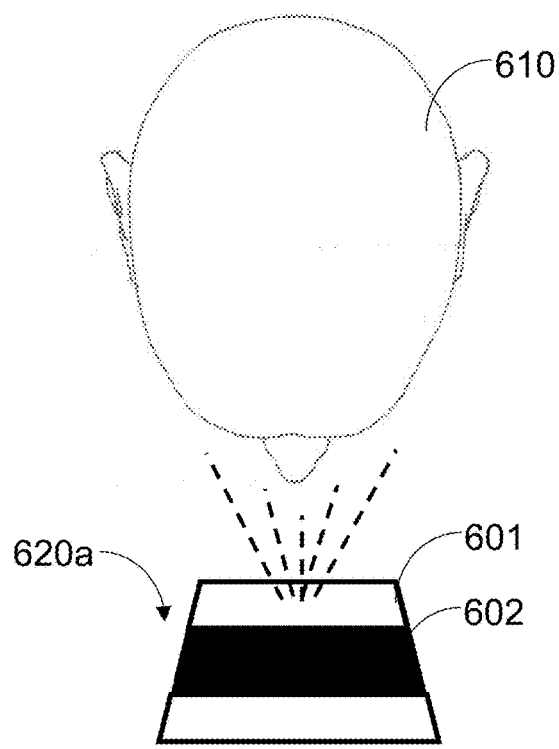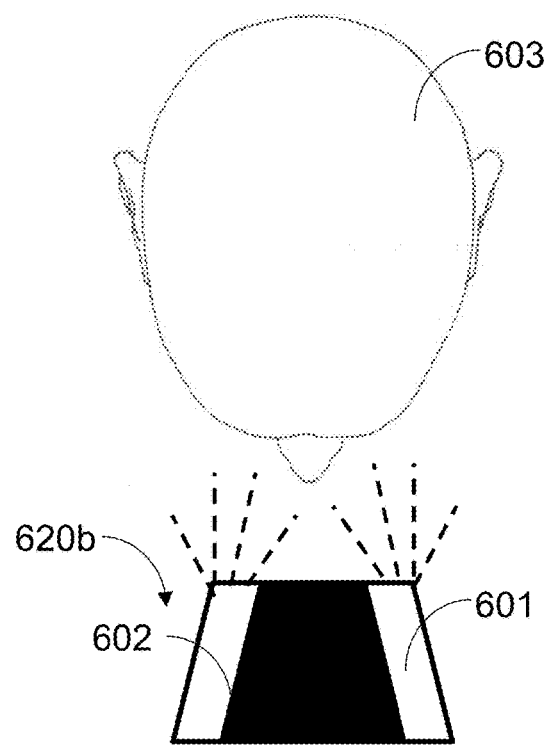
Fig. 6A
Fig. 6B
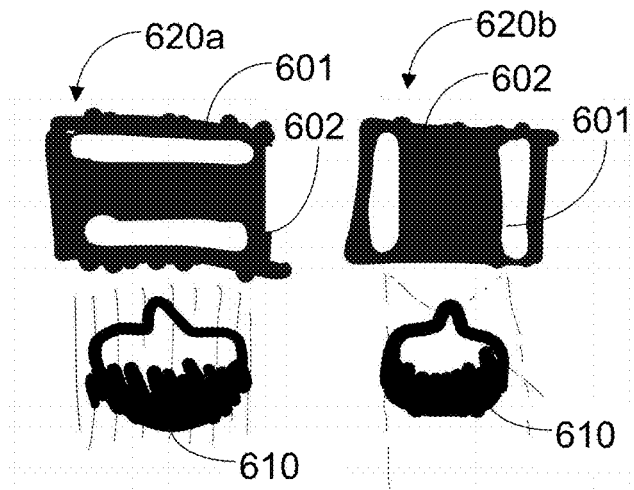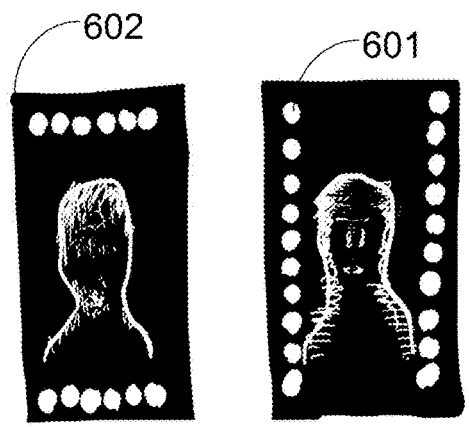
Fig. 6C
Fig. 6D

METHODS, SYSTEMS, AND MEDIA FOR DETECTING SPOOFING IN MOBILE AUTHENTICATION

CROSS-REFERENCE TO RELATED APPLICATIONS

This application is a continuation of U.S. application Ser. No. 16/134,781, filed on Sep. 18, 2018, which claims the benefit of U.S. Provisional Application No. 62/560,038, filed Sep. 18, 2017, which is hereby incorporated by reference in its entirety.

BACKGROUND

"Spoofing" a security system is generally defined as an act of masquerading as an authenticated user, by submitting false data. In this case, methods of liveness detection may be employed to determine whether a biometric modality, such as a face, a palm (palm print), a finger (fingerprint), or an ear, carries the unique structural qualities of the original three-dimensional biometric modality, or is-a two-dimensional replicate.

SUMMARY

Many current technologies for optical recognition of identity can be easily spoofed or hacked. In the case of facial recognition on mobile devices, for example, it is common for the facial recognition algorithms to be tricked into accepting a fake representation of a user's face, as presented via an image of the user's face on the front-facing video screen of another mobile device, or as presented via a print-out of the user's face on paper, among other methods of identity spoofing. Moreover, biometric implementations such as the facial recognition algorithm described in this example, providing identity management on mobile devices, are a regular feature of mobile devices across the world, and there is a current unmet need for an automated authentication technology for optical recognition of identity, while maintaining immunity to spoofing attempts.

One aspect disclosed herein is a mobile device comprising: a front-facing camera, a front-facing screen, at least one processor, a memory, an operating system configured to perform executable instructions, and a computer program including instructions executable by the at least one processor to run an application for detecting spoofing of a 3D object, using a 2D representation, in a mobile object authentication process, the application comprising: a software module capturing, via the front-facing camera, image data of the 3D object while displaying, via the front-facing screen, an authentication pattern comprising a plurality of regions, wherein at least one of the regions varies in at least one of: brightness, position, size, shape, and color over time causing a variance of lighting effects which create highlights and shadows on the 3D object over time; a software module using the image data and the authentication pattern to determine a current spatial characteristic of the 3D object; and a software module determining if spoofing of the 3D object, using a 2D representation, is attempted in the mobile authentication process by comparing the current spatial characteristic of the 3D object with a stored reference spatial characteristic of the 3D object.

In some embodiments, the 3D object comprises a face, a palm (palm print), a finger (fingerprint), or an ear. In some embodiments, the 2D representation comprises a photograph of the 3D object. In some embodiments, the image data comprises a plurality of photographs of the 3D object. In some embodiments, the image data comprises a video of the 3D object. In some embodiments, the authentication pattern comprises a plurality of images. In some embodiments, the authentication pattern comprises a video. In some embodiments, the plurality of regions are arranged in two or more vertical or horizontal bands in the authentication pattern. In some embodiments, the plurality of regions are arranged in a horizontal band across the top or bottom of the screen, or in a vertical band across the left or right side of the screen in the authentication pattern. In some embodiments, the authentication pattern comprises variation of at least one region in at least one of: brightness, position, size, shape, and color to form a regular pulse or a random pulse in the authentication pattern. In some embodiments, at least one of the regions varies in position over time to form a translation or rotation of the region in the authentication pattern. In some embodiments, at least one of the regions varies in size over time to form a contraction or expansion of the region in the authentication pattern. In some embodiments, the application further comprises a software module receiving a request to authenticate the 3D object. In some embodiments, the application further comprises a software module instructing a user to orient the front-facing camera of the mobile device in a fixed position relative to the object during the capturing of the image data. In some embodiments, the variation of at least one region in at least one of: brightness, position, size, shape, and color encode information in the authentication pattern.

A second aspect disclosed herein is a system for detecting spoofing of a 3D object, using a 2D representation, in a mobile object authentication process, the system comprising: a mobile device comprising a front-facing camera, a front-facing screen, at least one processor, a memory; and a server comprising at least one processor and a memory: the mobile device configured to: capture, via the front-facing camera, image data of the 3D object while displaying, via the front-facing screen, an authentication pattern comprising a plurality of regions, wherein at least one of the regions varies in at least one of: brightness, position, size, shape, and color over time causing a variance of lighting effects which create highlights and shadows on the 3D object over time; and transmit the image data and the authentication pattern to the server; the server configured to: receive the image data and the authentication pattern from the mobile device; use the image data and the authentication pattern to determine a current spatial characteristic of the 3D object; determine if spoofing of the 3D object, using a 2D representation, is attempted in the mobile authentication process by comparing the current spatial characteristic of the 3D object with a stored reference spatial characteristic of the 3D object; and transmit a result spoofing result to the mobile device.

In some embodiments, the 3D object comprises a face, a palm (palm print), a finger (fingerprint), or an ear. In some embodiments, the 2D representation comprises a photograph of the 3D object. In some embodiments, the image data comprises a plurality of photographs of the 3D object. In some embodiments, the image data comprises a video of the 3D object. In some embodiments, the authentication pattern comprises a plurality of images. In some embodiments, the authentication pattern comprises a video. In some embodiments, the plurality of regions are arranged in two or more vertical or horizontal bands in the authentication pattern. In some embodiments, the plurality of regions are arranged in a horizontal band across the top or bottom of the screen, or in a vertical band across the left or right side of the screen in the authentication pattern. In some embodiments, the authentication pattern comprises variation of at least one region in at least one of: brightness, position, size, shape, and color to form a regular pulse or a random pulse in the authentication pattern. In some embodiments, at least one of the regions varies in position over time to form a translation or rotation of the region in the authentication pattern. In some embodiments, at least one of the regions varies in size over time to form a contraction or expansion of the region in the authentication pattern. In some embodiments, the application further comprises a software module receiving a request to authenticate the 3D object. In some embodiments, the application further comprises a software module instructing a user to orient the front-facing camera of the mobile device in a fixed position relative to the object during the capturing of the image data. In some embodiments, the variation of at least one region in at least one of: brightness, position, size, shape, and color encode information in the authentication pattern.

A third aspect disclosed herein is a method of detecting spoofing of a 3D object, using a 2D representation, in a mobile object authentication process, the method comprising: capturing, via a front-facing camera of a mobile device, image data of the 3D object while displaying, via a front-facing screen of the mobile device, an authentication pattern comprising a plurality of regions, wherein at least one of the regions varies in at least one of: brightness, position, size, shape, and color over time causing a variance of lighting effects which create highlights and shadows on the 3D object over time; using the image data and the authentication pattern to determine a current spatial characteristic of the 3D object; and determining if spoofing of the 3D object, using a 2D representation, is attempted in the mobile authentication process by comparing the current spatial characteristic of the 3D object with a stored reference spatial characteristic of the 3D object.

In some embodiments, the 3D object comprises a face, a palm (palm print), a finger (fingerprint), or an ear. In some embodiments, the 2D representation comprises a photograph of the 3D object. In some embodiments, the image data comprises a plurality of photographs of the 3D object. In some embodiments, the image data comprises a video of the 3D object. In some embodiments, the authentication pattern comprises a plurality of images. In some embodiments, the authentication pattern comprises a video. In some embodiments, the plurality of regions are arranged in two or more vertical or horizontal bands in the authentication pattern. In some embodiments, the plurality of regions are arranged in a horizontal band across the top or bottom of the screen, or in a vertical band across the left or right side of the screen in the authentication pattern. In some embodiments, the authentication pattern comprises variation of at least one region in at least one of: brightness, position, size, shape, and color, to form a regular pulse or a random pulse in the authentication pattern. In some embodiments, at least one of the regions varies in position over time to form a translation or rotation of the region in the authentication pattern. In some embodiments, at least one of the regions varies in size over time to form a contraction or expansion of the region in the authentication pattern. In some embodiments, further comprising receiving a request to authenticate the 3D object. In some embodiments, further comprising instructing a user to orient the front-facing camera of the mobile device in a fixed position relative to the object during the capturing of the image data. In some embodiments, the variation of at least one region in at least one of: brightness, position, size, shape, and color, encode information in the authentication pattern.

A fourth aspect provided herein is a mobile device comprising: a front-facing camera, a front-facing screen, at least one processor, a memory, an operating system configured to perform executable instructions, and a computer program including instructions executable by the at least one processor to run an application for recognizing a class or a within-class identity of a 3D object, solely or in combination with other mobile processes of object detection and identity recognition, the application comprising: a software module capturing, via the front-facing camera, image data of the 3D object while displaying, via the front-facing screen, an identification pattern comprising a plurality of regions, wherein at least one of the regions varies in at least one of: brightness, position, size, shape, and color over time causing a variance of lighting effects which create highlights and shadows on the 3D object over time; a software module using the image data and the identification pattern to determine a current spatial characteristic of the 3D object; and a software module determining the class, or the within-class identity of the 3D object, solely or in combination with other mobile processes of object detection and identity recognition by comparing the current spatial characteristic of the 3D object with a stored reference spatial characteristic of the 3D object.

In some embodiments, the 3D object comprises a face, a palm (palm print), a finger (fingerprint), or an ear. In some embodiments, the image data comprises a plurality of photographs of the 3D object. In some embodiments, the image data comprises a video of the 3D object. In some embodiments, the identification pattern comprises a plurality of images. In some embodiments, the identification pattern comprises a video. In some embodiments, the plurality of regions are arranged in two or more vertical or horizontal bands in the identification pattern. In some embodiments, the plurality of regions are arranged in a horizontal band across the top or bottom of the screen, or in a vertical band across the left or right side of the screen in the identification pattern. In some embodiments, the identification pattern comprises variation of at least one region in at least one of: brightness, position, size, shape, and color to form a regular pulse or a random pulse in the identification pattern. In some embodiments, at least one of the regions varies in position over time to form a translation or rotation of the region in the identification pattern. In some embodiments, at least one of the regions varies in size over time to form a contraction or expansion of the region in the identification pattern. In some embodiments, the application further comprises a software module receiving a request to recognize the class, or the within-class identity of the 3D object. In some embodiments, the application further comprises a software module instructing a user to orient the front-facing camera of the mobile device in a fixed position relative to the object during the capturing of the image data. In some embodiments, the variation of at least one region in at least one of: brightness, position, size, shape, and color encode information in the identification pattern.

A fifth aspect provided herein is a system for recognizing a class or a within-class identity of a 3D object, solely or in combination with other mobile processes of object detection and identity recognition, the system comprising: a mobile device comprising a front-facing camera, a front-facing screen, at least one processor, a memory; and a server comprising at least one processor and a memory: the mobile device configured to: capture, via the front-facing camera, image data of the 3D object while displaying, via the front-facing screen, an identification pattern comprising a plurality of regions, wherein at least one of the regions varies in at least one of: brightness, position, size, shape, and color over time causing a variance of lighting effects which create highlights and shadows on the 3D object over time; and transmit the image data and the identification pattern to the server; the server configured to: receive the image data and the identification pattern from the mobile device; use the image data and the identification pattern to determine a current spatial characteristic of the 3D object; determine the class, or the within-class identity of the 3D object, solely or in combination with other mobile processes of object detection and identity recognition, by comparing the current spatial characteristic of the 3D object with a stored reference spatial characteristic of the 3D object; and transmit the class, or the within-class identity of the 3D object to the mobile device.

In some embodiments, the 3D object comprises a face, a palm (palm print), a finger (fingerprint), or an ear. In some embodiments, the image data comprises a plurality of photographs of the 3D object. In some embodiments, the image data comprises a video of the 3D object. In some embodiments, the identification pattern comprises a plurality of images. In some embodiments, the identification pattern comprises a video. In some embodiments, the plurality of regions are arranged in two or more vertical or horizontal bands in the identification pattern. In some embodiments, the plurality of regions are arranged in a horizontal band across the top or bottom of the screen, or in a vertical band across the left or right side of the screen in the identification pattern. In some embodiments, the identification pattern comprises variation of at least one region in at least one of: brightness, position, size, shape, and color to form a regular pulse or a random pulse in the identification pattern. In some embodiments, at least one of the regions varies in position over time to form a translation or rotation of the region in the identification pattern. In some embodiments, at least one of the regions varies in size over time to form a contraction or expansion of the region in the identification pattern. In some embodiments, the application further comprises a software module receiving a request to determine a class or within-class identity of the 3D object. In some embodiments, the application further comprises a software module instructing a user to orient the front-facing camera of the mobile device in a fixed position relative to the object during the capturing of the image data. In some embodiments, the variation of at least one region in at least one of: brightness, position, size, shape, and color encode information in the identification pattern.

A sixth aspect provided herein is a method of recognizing a class or within-class identity of a 3D object, solely or in combination with other mobile processes of object detection and identity recognition, the method comprising: capturing, via a front-facing camera of a mobile device, image data of the 3D object while displaying, via a front-facing screen of the mobile device, an identification pattern comprising a plurality of regions, wherein at least one of the regions varies in at least one of: brightness, position, size, shape, and color over time causing a variance of lighting effects which create highlights and shadows on the 3D object over time; using the image data and the identification pattern to determine a current spatial characteristic of the 3D object; and determining the class, or the within-class identity of a 3D object of the 3D object, solely or in combination with other mobile processes of object detection and identity recognition, by comparing the current spatial characteristic of the 3D object with a stored reference spatial characteristic of the 3D object.

In some embodiments, the 3D object comprises a face, a palm (palm print), a finger (fingerprint), or an ear. In some embodiments, the image data comprises a plurality of photographs of the 3D object. In some embodiments, the image data comprises a video of the 3D object. In some embodiments, the identification pattern comprises a plurality of images. In some embodiments, the identification pattern comprises a video. In some embodiments, the plurality of regions are arranged in two or more vertical or horizontal bands in the identification pattern. In some embodiments, the plurality of regions are arranged in a horizontal band across the top or bottom of the screen, or in a vertical band across the left or right side of the screen in the identification pattern. In some embodiments, the identification pattern comprises variation of at least one region in at least one of: brightness, position, size, shape, and color, to form a regular pulse or a random pulse in the identification pattern. In some embodiments, at least one of the regions varies in position over time to form a translation or rotation of the region in the identification pattern. In some embodiments, at least one of the regions varies in size over time to form a contraction or expansion of the region in the identification pattern. In some embodiments, further comprising receiving a request to recognize a class or within-class identity of the 3D object. In some embodiments, further comprising instructing a user to orient the front-facing camera of the mobile device in a fixed position relative to the object during the capturing of the image data. In some embodiments, the variation of at least one region in at least one of: brightness, position, size, shape, and color, encode information in the identification pattern.

In some embodiments, the plurality of regions comprises 2 regions to 50 regions. In some embodiments, the plurality of regions comprises at least 2 regions. In some embodiments, the plurality of regions comprises at most 50 regions. In some embodiments, the plurality of regions comprises 2 regions to 3 regions, 2 regions to 4 regions, 2 regions to 5 regions, 2 regions to 10 regions, 2 regions to 15 regions, 2 regions to 20 regions, 2 regions to 25 regions, 2 regions to 30 regions, 2 regions to 35 regions, 2 regions to 40 regions, 2 regions to 50 regions, 3 regions to 4 regions, 3 regions to 5 regions, 3 regions to 10 regions, 3 regions to 15 regions, 3 regions to 20 regions, 3 regions to 25 regions, 3 regions to 30 regions, 3 regions to 35 regions, 3 regions to 40 regions, 3 regions to 50 regions, 4 regions to 5 regions, 4 regions to 10 regions, 4 regions to 15 regions, 4 regions to 20 regions, 4 regions to 25 regions, 4 regions to 30 regions, 4 regions to 35 regions, 4 regions to 40 regions, 4 regions to 50 regions, 5 regions to 10 regions, 5 regions to 15 regions, 5 regions to 20 regions, 5 regions to 25 regions, 5 regions to 30 regions, 5 regions to 35 regions, 5 regions to 40 regions, 5 regions to 50 regions, 10 regions to 15 regions, 10 regions to 20 regions, 10 regions to 25 regions, 10 regions to 30 regions, 10 regions to 35 regions, 10 regions to 40 regions, 10 regions to 50 regions, 15 regions to 20 regions, 15 regions to 25 regions, 15 regions to 30 regions, 15 regions to 35 regions, 15 regions to 40 regions, 15 regions to 50 regions, 20 regions to 25 regions, 20 regions to 30 regions, 20 regions to 35 regions, 20 regions to 40 regions, 20 regions to 50 regions, 25 regions to 30 regions, 25 regions to 35 regions, 25 regions to 40 regions, 25 regions to 50 regions, 30 regions to 35 regions, 30 regions to 40 regions, 30 regions to 50 regions, 35 regions to 40 regions, 35 regions to 50 regions, or 40 regions to 50 regions. In some embodiments, the plurality of regions comprises 2 regions, 3 regions, 4 regions, 5 regions, 10 regions, 15 regions, 20 regions, 25 regions, 30 regions, 35 regions, 40 regions, 50 regions, or more, including increments therein.

In some embodiments, a region comprises a percentage of the area of the screen of the mobile device of 0% to 99%. In some embodiments, a region comprises a percentage of the area of the screen of the mobile device of at least 0%. In some embodiments, a region comprises a percentage of the area of the screen of the mobile device of at most 99%. In some embodiments, a region comprises a percentage of the area of the screen of the mobile device of 0% to 1%, 0% to 10%, 0% to 20%, 0% to 30%, 0% to 40%, 0% to 50%, 0% to 60%, 0% to 70%, 0% to 80%, 0% to 90%, 0% to 99%, 1% to 10%, 1% to 20%, 1% to 30%, 1% to 40%, 1% to 50%, 1% to 60%, 1% to 70%, 1% to 80%, 1% to 90%, 1% to 99%, 10% to 20%, 10% to 30%, 10% to 40%, 10% to 50%, 10% to 60%, 10% to 70%, 10% to 80%, 10% to 90%, 10% to 99%, 20% to 30%, 20% to 40%, 20% to 50%, 20% to 60%, 20% to 70%, 20% to 80%, 20% to 90%, 20% to 99%, 30% to 40%, 30% to 50%, 30% to 60%, 30% to 70%, 30% to 80%, 30% to 90%, 30% to 99%, 40% to 50%, 40% to 60%, 40% to 70%, 40% to 80%, 40% to 90%, 40% to 99%, 50% to 60%, 50% to 70%, 50% to 80%, 50% to 90%, 50% to 99%, 60% to 70%, 60% to 80%, 60% to 90%, 60% to 99%, 70% to 80%, 70% to 90%, 70% to 99%, 80% to 90%, 80% to 99%, or 90% to 99%. In some embodiments, a region comprises a percentage of the area of the screen of the mobile device of 0%, 1%, 10%, 20%, 30%, 40%, 50%, 60%, 70%, 80%, 90%, or 99%.

In some embodiments, a region exhibits a percentage of the mobile device's brightness capability of 0% to 100%. In some embodiments, a region exhibits a percentage of the mobile device's brightness capability of at least 0%. In some embodiments, a region exhibits a percentage of the mobile device's brightness capability of at most 100%. In some embodiments, a region exhibits a percentage of the mobile device's brightness capability of 0% to 1%, 0% to 10%, 0% to 20%, 0% to 30%, 0% to 40%, 0% to 50%, 0% to 60%, 0% to 70%, 0% to 80%, 0% to 90%, 0% to 100%, 1% to 10%, 1% to 20%, 1% to 30%, 1% to 40%, 1% to 50%, 1% to 60%, 1% to 70%, 1% to 80%, 1% to 90%, 1% to 100%, 10% to 20%, 10% to 30%, 10% to 40%, 10% to 50%, 10% to 60%, 10% to 70%, 10% to 80%, 10% to 90%, 10% to 100%, 20% to 30%, 20% to 40%, 20% to 50%, 20% to 60%, 20% to 70%, 20% to 80%, 20% to 90%, 20% to 100%, 30% to 40%, 30% to 50%, 30% to 60%, 30% to 70%, 30% to 80%, 30% to 90%, 30% to 100%, 40% to 50%, 40% to 60%, 40% to 70%, 40% to 80%, 40% to 90%, 40% to 100%, 50% to 60%, 5% to 70%, 50% to 80%, 50% to 90%, 50% to 100%, 60% to 70%, 60% to 80%, 60% to 90%, 60% to 100%, 70% to 80%, 70% to 90%, 70% to 100%, 80% to 90%, 80% to 100%, or 90% to 100%. In some embodiments, a region exhibits a percentage of the mobile device's brightness capability of 0%, 1%, 10%, 20%, 30%, 40%, 50%, 60%, 70%, 80%, 90%, or 100%, including increments therein.

In some embodiments, a region exhibits a shape comprising a circle, an oval, an arch, an ellipse, a triangle, a square, a polygon, an amorphous shape, or any combination thereof. In some embodiments, a region exhibits a color comprising alice blue, antique white, aqua, aquamarine, azure, beige, bisque, black, blanched almond, blue, blue violet, brown, burly wood, cadet blue, chartreuse, chocolate, coral, cornflower blue, cornsilk, crimson, cyan, dark blue, dark cyan, dark golden rod, dark gray, dark grey, dark green, dark khaki, dark magenta, dark olive green, dark orange, dark orchid, dark red, dark salmon, dark sea green, dark slate blue, dark slate gray, dark turquoise, dark violet, deep pink, deep sky blue, dim grey, dodger blue, fire brick, floral white, forest green, fuchsia, gainsboro, ghost white, gold, golden rod, gray, green, green yellow, honey dew, hot pink, indian red, indigo, ivory, khaki, lavender, lavender blush, lawn green, lemon chiffon, light blue, light coral, light cyan, light goldenrod yellow, light grey, light green, light pink, light salmon, light sea green, light sky blue, light slate gray, light slate grey, light steel blue, light yellow, lime, lime green, linen, magenta, maroon, medium aqua marine, medium blue, medium orchid, medium purple, medium sea green, medium slate blue, medium spring green, medium turquoise, medium violet red, midnight blue, mint cream, misty rose, moccasin, navajo white, navy, old lace, olive, olive drab, orange, orange red, orchid, pale golden rod, pale green, pale turquoise, pale violet red, papaya whip, peach puff, peru, pink, plum, powder blue, purple, rebecca purple, red, rosy brown, royal blue, saddle brown, salmon, sandy brown, sea green, sea shell, sienna, silver, sky blue, slate blue, slate grey, snow, spring green, steel blue, tan, teal, thistle, tomato, turquoise, violet, wheat, white, white smoke, yellow, yellow green, or any combination thereof.

In some embodiments, the number of images in the authentication pattern is 2 to 10,000. In some embodiments, the number of images in the authentication pattern is at least 2. In some embodiments, the number of images in the authentication pattern is at most 10,000. In some embodiments, the number of images in the authentication pattern is 2 to 5, 2 to 10, 2 to 20, 2 to 50, 2 to 100, 2 to 200, 2 to 500, 2 to 1,000, 2 to 2,000, 2 to 5,000, 2 to 10,000, 5 to 10, 5 to 20, 5 to 50, 5 to 100, 5 to 200, 5 to 500, 5 to 1,000, 5 to 2,000, 5 to 5,000, 5 to 10,000, 10 to 20, 10 to 50, 10 to 100, 10 to 200, 10 to 500, 10 to 1,000, 10 to 2,000, 10 to 5,000, 10 to 10,000, 20 to 50, 20 to 100, 20 to 200, 20 to 500, 20 to 1,000, 20 to 2,000, 20 to 5,000, 20 to 10,000, 50 to 100, 50 to 200, 50 to 500, 50 to 1,000, 50 to 2,000, 50 to 5,000, 50 to 10,000, 100 to 200, 100 to 500, 100 to 1,000, 100 to 2,000, 100 to 5,000, 100 to 10,000, 200 to 500, 200 to 1,000, 200 to 2,000, 200 to 5,000, 200 to 10,000, 500 to 1,000, 500 to 2,000, 500 to 5,000, 500 to 10,000, 1,000 to 2,000, 1,000 to 5,000, 1,000 to 10,000, 2,000 to 5,000, 2,000 to 10,000, or 5,000 to 10,000. In some embodiments, the number of images in the authentication pattern is 2, 5, 10, 20, 50, 100, 200, 500, 1,000, 2,000, 5,000, or 10,000, including increments therein.

In some embodiments, the number of photographs of the 3D object that comprise the image data is 2 to 10,000. In some embodiments, the number of photographs of the 3D object that comprise the image data is at least 2. In some embodiments, the number of photographs of the 3D object that comprise the image data is at most 10,000. In some embodiments, the number of photographs of the 3D object that comprise the image data is 2 to 5, 2 to 10, 2 to 20, 2 to 50, 2 to 100, 2 to 200, 2 to 500, 2 to 1,000, 2 to 2,000, 2 to 5,000, 2 to 10,000, 5 to 10, 5 to 20, 5 to 50, 5 to 100, 5 to 200, 5 to 500, 5 to 1,000, 5 to 2,000, 5 to 5,000, 5 to 10,000, 10 to 20, 10 to 50, 10 to 100, 10 to 200, 10 to 500, 10 to 1,000, 10 to 2,000, 10 to 5,000, 10 to 10,000, 20 to 50, 20 to 100, 20 to 200, 20 to 500, 20 to 1,000, 20 to 2,000, 20 to 5,000, 20 to 10,000, 50 to 100, 50 to 200, 50 to 500, 50 to 1,000, 50 to 2,000, 50 to 5,000, 50 to 10,000, 100 to 200, 100 to 500, 100 to 1,000, 100 to 2,000, 100 to 5,000, 100 to 10,000, 200 to 500, 200 to 1,000, 200 to 2,000, 200 to 5,000, 200 to 10,000, 500 to 1,000, 500 to 2,000, 500 to 5,000, 500 to 10,000, 1,000 to 2,000, 1,000 to 5,000, 1,000 to 10,000, 2,000 to 5,000, 2,000 to 10,000, or 5,000 to 10,000. In some embodiments, the number of photographs of the 3D object that comprise the image data is 2, 5, 10, 20, 50, 100, 200, 500, 1,000, 2,000, 5,000, or 10,000, including increments therein.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 2G shows an illustration of a seventh exemplary image of an authentication pattern comprising a plurality of horizontally arrayed regions;

FIG. 2H shows an illustration of a eighth exemplary image of an authentication pattern comprising a plurality of vertically arrayed regions;

FIG. 3A shows an illustration of an exemplary first authentication pattern comprising a rotation of a region;

FIG. 3B shows an illustration of an exemplary second authentication pattern comprising a rotation of a plurality of regions;

FIG. 6A shows a top view illustration of the exemplary authentication image in FIG. 2E causing a variance of lighting effects which create highlights and shadows on a human face;

FIG. 6B shows a top view illustration of the exemplary authentication image in FIG. 2F causing a variance of lighting effects which create highlights and shadows on a human face;

FIG. 6C shows top view illustrations of the exemplary authentication images in FIGS. 2E and 2F causing a variance of lighting effects which create highlights and shadows on a human face;

FIG. 6D shows front view illustrations of the exemplary authentication images in FIGS. 2E and 2F causing a variance of lighting effects which create highlights and shadows on a human face;

DETAILED DESCRIPTION OF THE DRAWINGS

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "front-facing camera" refers to a feature of cameras, mobile phones, smartphones, tablets and similar mobile devices that allows a user to take self-portrait, photograph, or video while looking at the display of the device.

As used herein, the term "3D" refers to having a length, a breadth, and a depth.

As used herein, the term "2D" refers to having a length and a breadth, a length and a depth, or a breadth and a depth, of much greater magnitude in relation to any third dimension of the object as to the 3D object for which it is presented as a spoof.

While preferred embodiments of the present subject matter have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the subject matter described herein may be employed in practicing the disclosure.

Devices for Detecting Spoofing of a 3D Object

Figure 1:
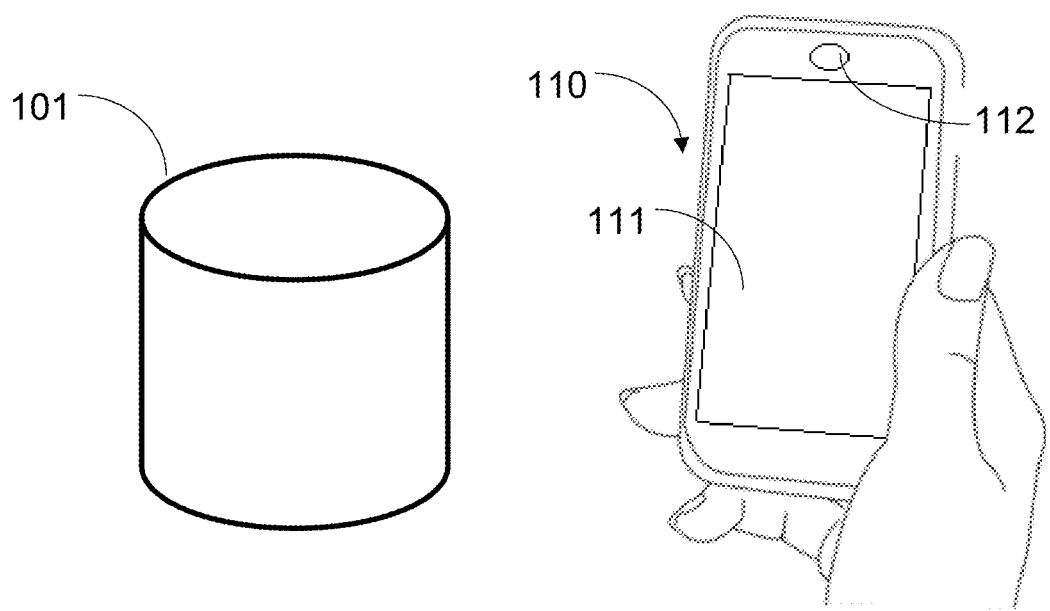
FIG. 1 shows an illustration of an exemplary device for detecting spoofing of a 3D object, using a 2D representation, in a mobile object authentication process.

Provided herein, per FIG. 1, is a mobile device 110 for detecting spoofing of a 3D object 101 comprising a front-facing screen 111, and a front-facing camera 112; at least one processor; a memory, an operating system configured to perform executable instructions; and a computer program including instructions executable by the at least one processor to run an application for detecting spoofing of a 3D object 101, using a 2D representation, in a mobile object authentication process. In some embodiments, the application comprises: a software module capturing, via the front-facing camera 112, image data of the 3D object 101 while displaying, via the front-facing screen 111, an authentication pattern comprising a plurality of regions, wherein at least one of the regions varies in at least one of: brightness, position, size, shape, and color over time causing a variance of lighting effects which create highlights and shadows on the 3D object 101 over time. In some embodiments, the mobile device 110 further comprises a software module using the image data and the authentication pattern to determine a current spatial characteristic of the 3D object 101, and a software module determining if spoofing of the 3D object 101, using a 2D representation, is attempted in the mobile authentication process, by comparing the current spatial characteristic of the 3D object 101 with a stored reference spatial characteristic of the 3D object 101.

In some embodiments, the 3D object 101 comprises a face, a palm (palm print), a finger (fingerprint), or an ear. In some embodiments, the 3D object 101 comprises a human face. In some embodiments, the 2D representation comprises a photograph of the 3D object 101. In some embodiments, the image data comprises a plurality of photographs of the 3D object 101. In some embodiments, the image data comprises a video of the 3D object 101. In some embodiments, the authentication pattern comprises a plurality of images. In some embodiments, the authentication pattern comprises a video. In some embodiments, the plurality of regions is arranged in two or more vertical or horizontal bands in the authentication pattern. In some embodiments, the plurality of regions are arranged in a horizontal band across the top or bottom of the screen, or in a vertical band across the left or right side of the screen in the authentication pattern. In some embodiments, the authentication pattern comprises variation of at least one region in at least one of: brightness, position, size, shape, and color to form a regular pulse or a random pulse in the authentication pattern. In some embodiments, at least one of the regions varies in position over time to form a translation or rotation of the region in the authentication pattern. In some embodiments, at least one of the regions varies in size over time to form a contraction or expansion of the region in the authentication pattern. In some embodiments, the application further comprises a software module receiving a request to authenticate the 3D object 101. In some embodiments, the application further comprises a software module instructing a user to orient the front-facing camera of the mobile device in a fixed position relative to the object during the capturing of the image data. In some embodiments, the variation of at least one region in at least one of: brightness, position, size, shape, and color encode information in the authentication pattern.

Authentication Patterns

Figure 2A:
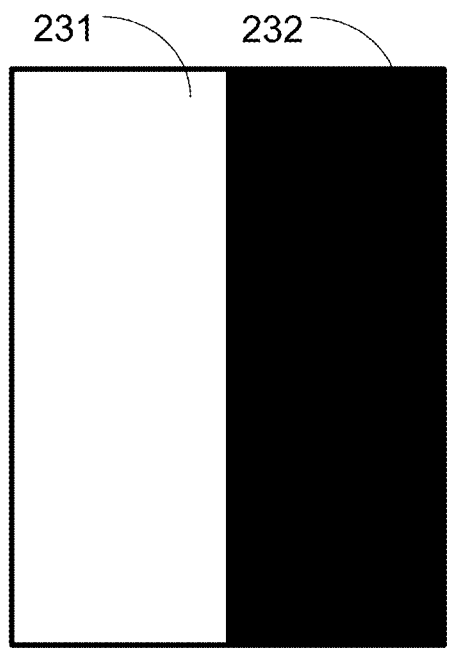
FIG. 2A shows an illustration of a first exemplary image of an authentication pattern comprising two horizontally arrayed regions.

FIGS. 2A to 2I1, shows illustrations of exemplary images of the plurality of images which comprises the authentication pattern, wherein the authentication pattern comprises a plurality of regions that differ in brightness, color, or any combination thereof.

Figure 2B:
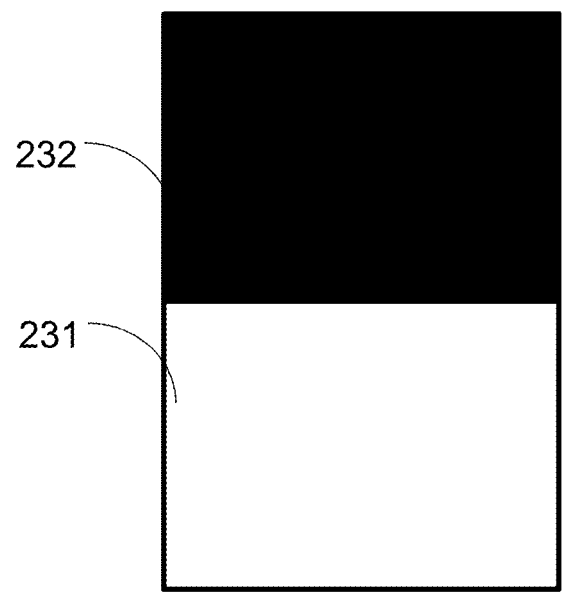
FIG. 2B shows an illustration of a second exemplary image of an authentication pattern comprising two vertically arrayed regions.
Figure 2C:
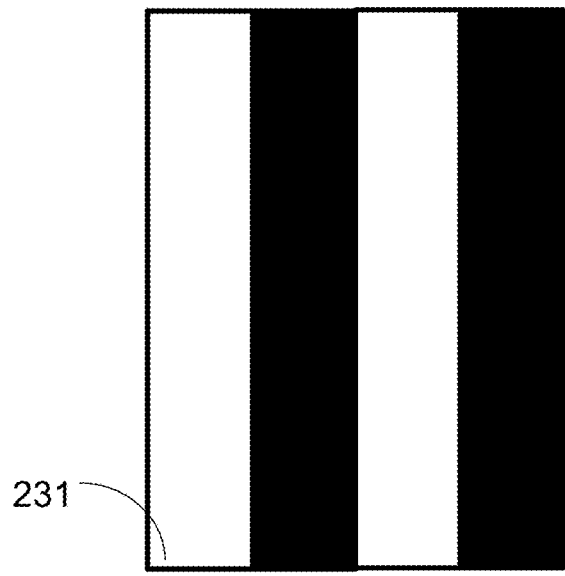
FIG. 2C shows an illustration of a third exemplary image of an authentication pattern comprising four horizontally arrayed regions.
Figure 2D:
FIG. 2D shows an illustration of a fourth exemplary image of an authentication pattern comprising four vertically arrayed regions.

In some embodiments, per FIG. 2A, the plurality of regions comprises a high brightness region 231 and a low brightness region 232, that are arranged in two vertical bands. In some embodiments, per FIG. 2B, the plurality of regions comprises a high brightness region 231 and a low brightness region 232, that are arranged in two horizontal bands. In some embodiments, the high brightness region 231 is displayed on the left, right, top or bottom of the low brightness region 232. In some embodiments, per FIG. 2C, the plurality of regions comprises two high brightness regions 231 and two low brightness regions 232 that are arranged in four alternating vertical bands. In some embodiments, per FIG. 2D, the plurality of regions comprises two high brightness regions 231 and two low brightness regions 232 that are arranged in four alternating horizontal bands. In some embodiments, per FIG. 2G, the plurality of regions comprises a plurality of high brightness regions 231 and a plurality of low brightness regions 232 that are arranged in alternating horizontal, or vertical, bands.

Figure 2E:
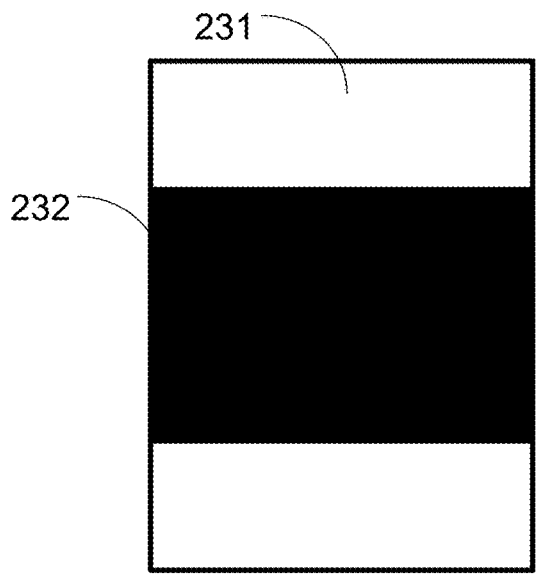
FIG. 2E shows an illustration of a fifth exemplary image of an authentication pattern comprising three regions arranged in vertical bands.
Figure 2F:
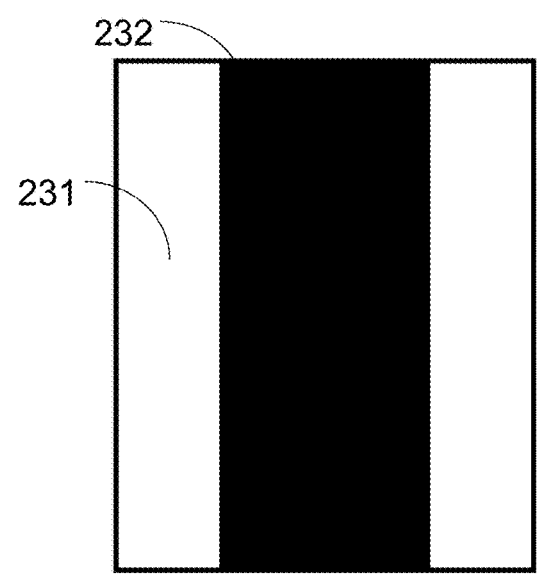
FIG. 2F shows an illustration of a sixth exemplary image of an authentication pattern comprising three regions arranged in horizontal bands.

In some embodiments, per FIG. 2E, the plurality of regions comprises two horizontal bands of high brightness regions 231 across the top and bottom of the screen, and a single horizontal band of a low brightness region 232 across the middle of the screen. In some embodiments, per FIG. 2F, the plurality of regions comprises vertical or horizontal bands of high brightness regions 231 along the left and right sides of the screen, and a single vertical band of a low brightness region 232 along the middle of the screen. In some embodiments, per FIG. 2G, the plurality of regions comprises a plurality of randomly shaped and positioned, high brightness regions 231 and low brightness regions 232.

In some embodiments the authentication pattern comprises a variation of at least one region in at least one of: brightness, position, size, shape, and color to form a regular pulse or a random pulse. In some embodiments, per FIGS. 3A and 3B, at least one of the high brightness regions 331 and low brightness regions 332 vary in position over time to form a translation or rotation of the region in the authentication pattern. In some embodiments, at least one of the regions varies in size over time, to form a contraction or expansion of the region in the authentication pattern.

Methods for Detecting Spoofing of a 3D Object

Figure 4A:
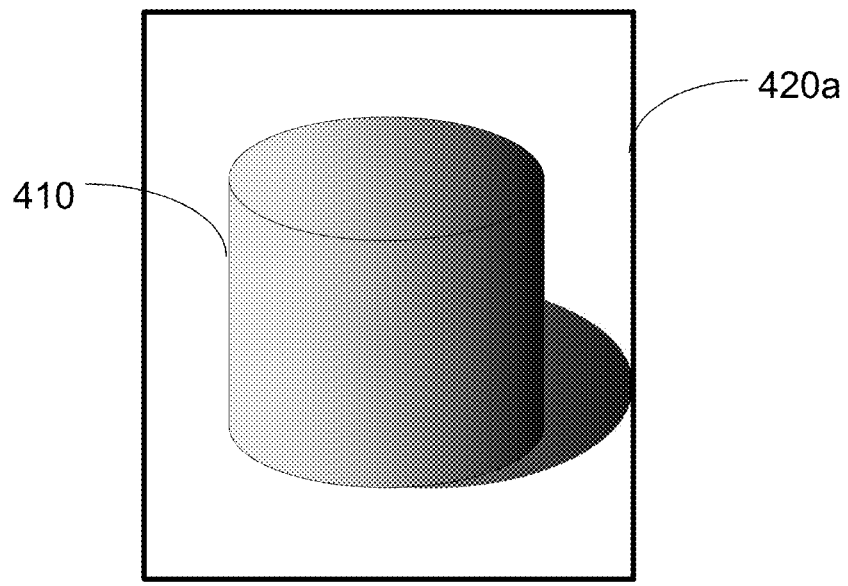
FIG. 4A shows an illustration of an exemplary first image data, displaying the highlights and shadows on an object resulting from the authentication image in FIG. 2A.
Figure 4B:
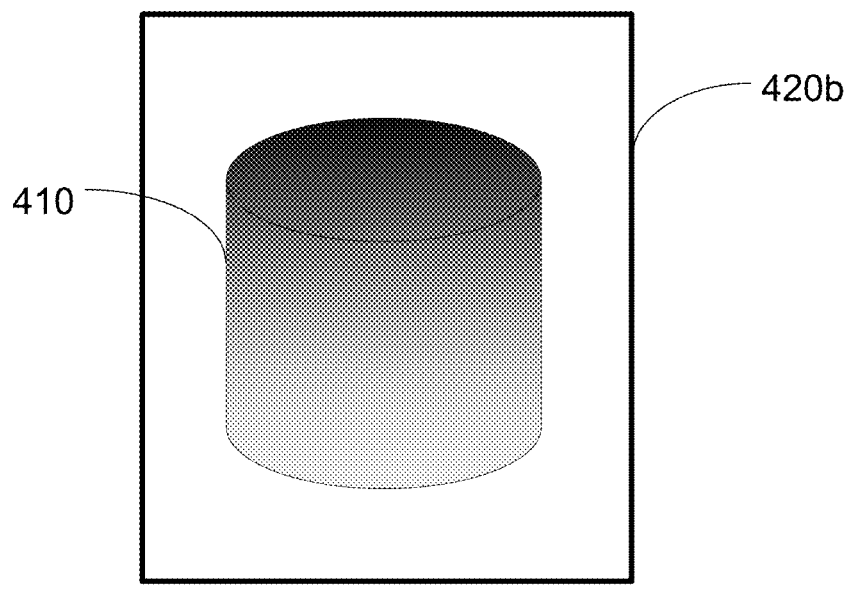
FIG. 4B shows an illustration of an exemplary first image data, displaying the highlights and shadows on an object resulting from the authentication image in FIG. 2B.

Provided herein, per FIGS. 4A and 4B is a method of detecting spoofing of a 3D object 410, using a 2D representation 420a, 420b, in a mobile object authentication process, the method comprising: capturing, via a front-facing camera of a mobile device, image data of the 3D object 410 while displaying, via a front-facing screen of the mobile device, an authentication pattern comprising a plurality of regions, wherein at least one of the regions varies in at least one of: brightness, position, size, shape, and color over time causing a variance of lighting effects which create highlights and shadows on the 3D object 410 over time; using the image data and the authentication pattern to determine a current spatial characteristic of the 3D object 410; and determining if spoofing of the 3D object 410, using a 2D representation 420a, 420b, is attempted in the mobile authentication process by comparing the current spatial characteristic of the 3D object 410 with a stored reference spatial characteristic of the 3D object 410.

In some embodiments an authentication pattern comprises a plurality of regions, wherein at least one of the regions varies in at least one of: brightness, position, size, shape, and color over time causing a variance of lighting effects which create highlights and shadows on the 3D object 410 over time, per FIGS. 4A and 4B. In some embodiments the authentication pattern comprises a plurality of images. In the case wherein the regions in an image of the authentication pattern comprise a single high brightness region displayed on the left side of the front-facing-screen, and a low high brightness region displayed on the right side of the front-facing-screen, as per FIG. 2A, the highlights and shadows on the 3D object 410, are seen in the exemplary 2D representation 420a in FIG. 4A. In the case wherein the regions in an image of the authentication pattern comprise a single high brightness region displayed on the bottom of the front-facing-screen, and a low high brightness region displayed on the top of the front-facing-screen, as per FIG. 2B, the highlights and shadows on the 3D object 410, are seen in the exemplary 2D representation 420b in FIG. 4B.

The differences between the 2D representations 420a, 420b of the 3D object 410, may be used to determine a spatial characteristic of the 3D object 410, and to determine if spoofing of the 3D object 410, using a 2D representation 420a, 420b, is attempted in the mobile authentication process, by comparing the current spatial characteristic of the 3D object 410 with a stored reference spatial characteristic of the 3D object 410.

Once a current spatial characteristic of the 3D object 410 from the image data and the authentication pattern is determined to match a stored reference spatial characteristic of the 3D object 410, an access may be granted if no spoofing is detected, or block access to the user if spoofing is detected. An authority may additionally be alerted with information related to the time, location, device, account, or any combination thereof associated with the spoofing attempt.

In some embodiments, the authentication pattern comprises a plurality of regions, wherein at least one of the regions varies in at least one of: brightness, position, size, shape, and color over time causing a variance of lighting effects which create highlights and shadows on the 3D object 410 over time, and wherein the variation of at least one region in at least one of: brightness, position, size, shape, and color, encodes information in the authentication pattern. In some embodiments, the encoded information comprises encoded information corresponding to the user, the object, the authentication attempt, or any combination thereof. In some embodiments, determination that highlights and shadows on the 3D object 410, captured by the 2D representation 420a, 420b, correlate with the information encoded within the authentication pattern, serves as an additional factor of authentication and/or security.

Figure 5A:
FIG. 5A shows an illustration of an exemplary first image data, displaying the highlights and shadows on a human face resulting from the authentication image in FIG. 2A.
Figure 5B:
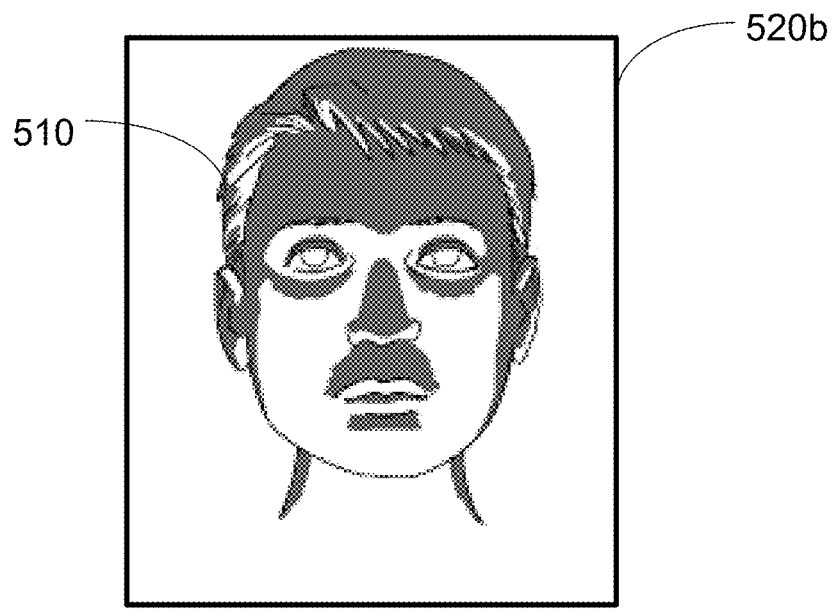
FIG. 5B shows an illustration of an exemplary first image data, displaying the highlights and shadows on a human face resulting from the authentication image in FIG. 2B.
Figure 7A:
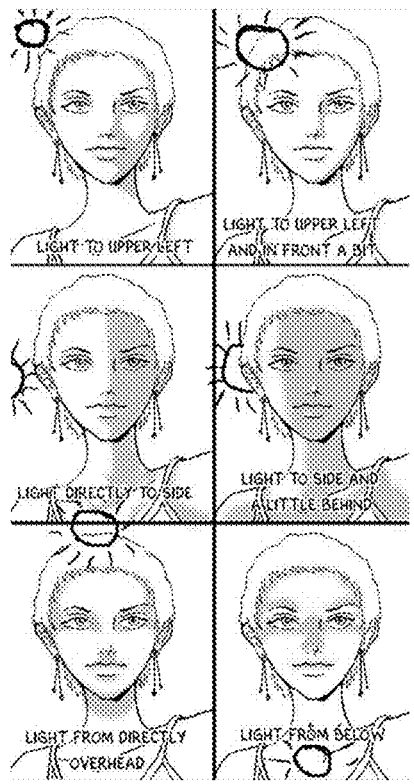
FIG. 7A shows illustrations of exemplary highlights and shadows on a human face as a result of brightness applied from a variety of directions.
Figure 7B:
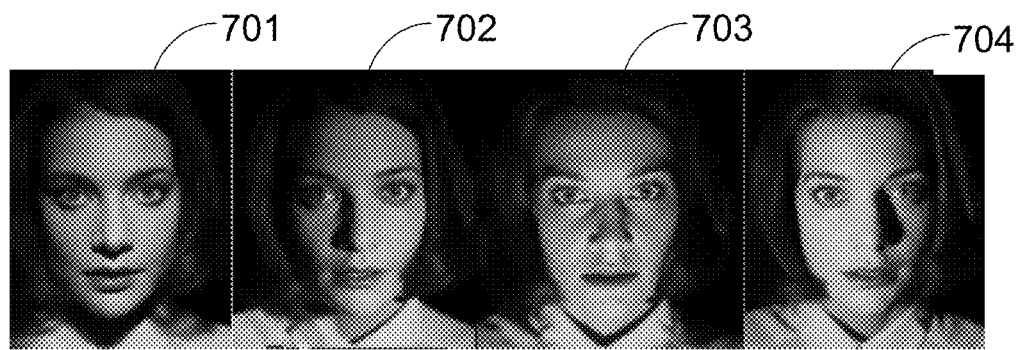
FIG. 7B shows exemplary pictures of highlights and shadows on a human face as a result of brightness applied from a variety of directions.

In some embodiments, per FIGS. 5A and 5B, the object comprises a human face 510 wherein the front-facing camera captures the 2D representation 520a, 520b of the human face 510 to detect spoofing. In some embodiments, per FIG. 5A, the authentication pattern comprises a plurality of images, wherein each image of the authentication pattern comprises a plurality of regions, and wherein at least one of the regions varies in at least one of: brightness, position, size, shape, and color over time causing a variance of lighting effects which create highlights and shadows on the 3D object 510 over time. In the case wherein the plurality of regions in the authentication pattern comprises a single low brightness region displayed on the left side of the front-facing-screen, and a single high brightness region displayed on the right side of the front-facing-screen, as per FIG. 2A, the highlights and shadows on the human face 510, are seen in the exemplary 2D representation 520a in FIG. 5A. In the case wherein the plurality of regions in the authentication pattern comprises a single low brightness region displayed on the top side of the front-facing-screen, and a single high brightness region displayed on the bottom side of the front-facing-screen, as per FIG. 2B, the highlights and shadows on the human face 510, are seen in the exemplary 2D representation 520b in FIG. 5B.

The differences between the 2D representations 520a, 520b of the human face 510, may be used to determine a spatial characteristic of the human face 510, and to determine if spoofing of the human face 510, using a 2D representation 520a, 520b, is attempted in the mobile authentication process by comparing the current spatial characteristic of the human face 510 with a stored reference spatial characteristic of the human face 510.

Once a current spatial characteristic of the human face 510 from the image data and the authentication pattern is determined to match a stored reference spatial characteristic of the human face 510, an access may be granted if no spoofing is detected, or block access to the user if spoofing is detected. An authority may additionally be alerted with information related to the time, location, device, account, or any combination thereof associated with the spoofing attempt.

In some embodiments, per FIGS. 6A, 6B, and 6C, the object comprises a human face 610 and the front-facing camera captures the 2D representation of the human face 610 to detect spoofing. In some embodiments, the authentication pattern comprises a plurality of images, wherein an image comprises a plurality of regions, and wherein at least one of the regions varies in at least one of: brightness, position, size, shape, and color over time causing a variance of lighting effects which create highlights and shadows on the human face 610 over time. It can be seen, per FIG. 6A, that an image of a first authentication pattern 620a comprising a two high brightness regions 601 displayed along the top and bottom of the front-facing-screen, and a single low brightness region 602 displayed along the middle of the front-facing-screen, as per FIG. 2E casts certain highlights and shadows on the human face 610. By contrast, an image of a second authentication pattern 620b, per FIG. 6B, comprising a two high brightness regions 601 displayed along the left and right sides of the front-facing-screen, and a single low brightness region 602 displayed along a middle band of the front-facing-screen, as per FIG. 2F casts different highlights and shadows on the human face 610.

The differences between the 2D representations captured of the human face 610, while the front-facing-screen displays the first authentication image 620a and while the front-facing-screen displays the second authentication image 620b, may be used to determine a current spatial characteristic of the human face 610, and to determine if spoofing of the human face 610, using a 2D representation, is attempted in the mobile authentication process by comparing the current spatial characteristic of the human face 610 with a stored reference spatial characteristic of the human face 610.

Per FIG. 6D, it can be seen that if the object is in fact a human face 610, and if the authentication pattern comprises high brightness regions across the top and bottom of the screen and the single horizontal band of a low brightness region in the middle of the screen, as per FIG. 2E, the spatial characteristic of the human face 610 should exhibit highlights on the top of the head of the human face 610, and on the chin of the human face 610. Per FIG. 6D, it can also be seen that if the object is in fact a human face 610, and if the authentication pattern comprises high brightness regions across the left and right sides of the screen and the single horizontal band of a low brightness region across the middle of the screen, as per FIG. 2F, the spatial characteristic of the human face 610 should exhibit highlights on the left and right sides of the head of the human face 610.

Once a current spatial characteristic of the human face 610 from the image data and the authentication pattern is determined to match a stored reference spatial characteristic of the human face 610, an access may be granted if no spoofing is detected, or block access to the user if spoofing is detected. An authority may additionally be alerted with information related to the time, location, device, account, or any combination thereof associated with the spoofing attempt.

Systems for Detecting Spoofing of a 3D Object

Provided herein is a system for detecting spoofing of a 3D object, using a 2D representation, in a mobile object authentication process, the system comprising: a mobile device comprising a front-facing camera, a front-facing screen, at least one processor, a memory; and a server comprising at least one processor and a memory: the mobile device configured to: capture, via the front-facing camera, image data of the 3D object while displaying, via the front-facing screen, an authentication pattern comprising a plurality of regions, wherein at least one of the regions varies in at least one of: brightness, position, size, shape, and color over time causing a variance of lighting effects which create highlights and shadows on the 3D object over time; and transmit the image data and the authentication pattern to the server; the server configured to: receive the image data and the authentication pattern from the mobile device; use the image data and the authentication pattern to determine a current spatial characteristic of the 3D object; determine if spoofing of the 3D object, using a 2D representation, is attempted in the mobile authentication process by comparing the current spatial characteristic of the 3D object with a stored reference spatial characteristic of the 3D object; and transmit a result spoofing result to the mobile device.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® P53®, Sony® P54®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 8:
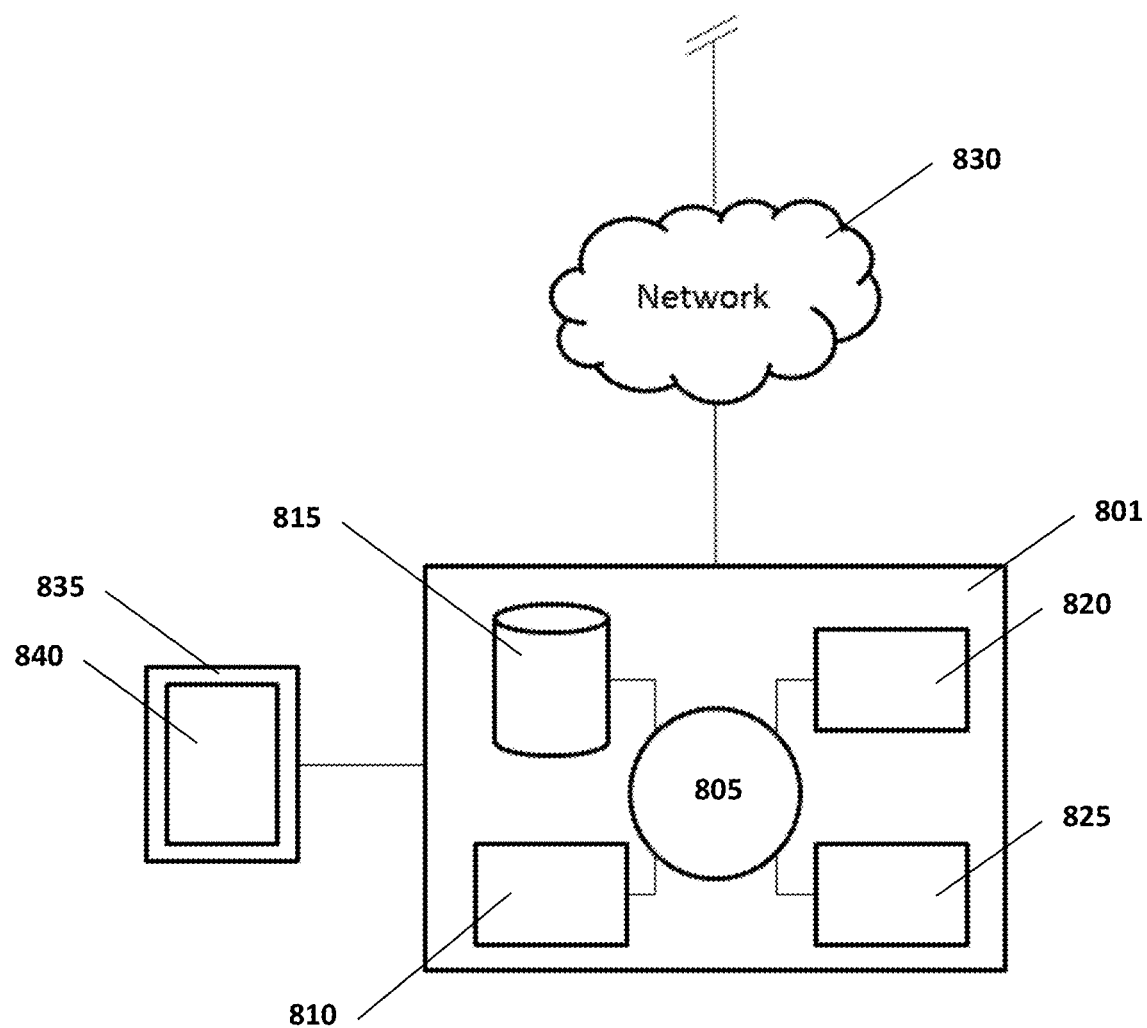
FIG. 8 shows a non-limiting schematic diagram of a digital processing device; in this case, a device with one or more CPUs, a memory, a communication interface, and a display.

Referring to FIG. 8, in a particular embodiment, an exemplary digital processing device 801 is programmed or otherwise configured to detect spoofing of a 3D object, using a 2D representation, in a mobile object authentication process. The digital processing device 801 can regulate various aspects of detecting spoofing of a 3D object of the present disclosure, such as, for example, capturing, via a front-facing camera of a mobile device, image data of the 3D object while displaying, via a front-facing screen of the mobile device, an authentication pattern; using the image data and the authentication pattern to determine a current spatial characteristic of the 3D object; determining if spoofing of the 3D object, using a 2D representation, is attempted in the mobile authentication process by comparing the current spatial characteristic of the 3D object with a stored reference spatial characteristic of the 3D object; or transmit image data and authentication pattern to a server. In this embodiment, the digital processing device 801 includes a central processing unit (CPU, also "processor" and "computer processor" herein) 805, which can be a single core or multi core processor, or a plurality of processors for parallel processing. The digital processing device 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The digital processing device 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the device 801, can implement a peer-to-peer network, which may enable devices coupled to the device 801 to behave as a client or a server.

Continuing to refer to FIG. 8, the CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and write back. The CPU 805 can be part of a circuit, such as an integrated circuit. One or more other components of the device 801 can be included in the circuit. In some cases, the circuit is an application specific integrated circuit (ASIC) or a field programmable gate array (FPGA).

Continuing to refer to FIG. 8, the storage unit 815 can store files, such as drivers, libraries and saved programs. The storage unit 815 can store user data, e.g., user preferences and user programs. The digital processing device 801 in some cases can include one or more additional data storage units that are external, such as located on a remote server that is in communication through an intranet or the Internet.

Continuing to refer to FIG. 8, the digital processing device 801 can communicate with one or more remote computer systems through the network 830. For instance, the device 801 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 9:
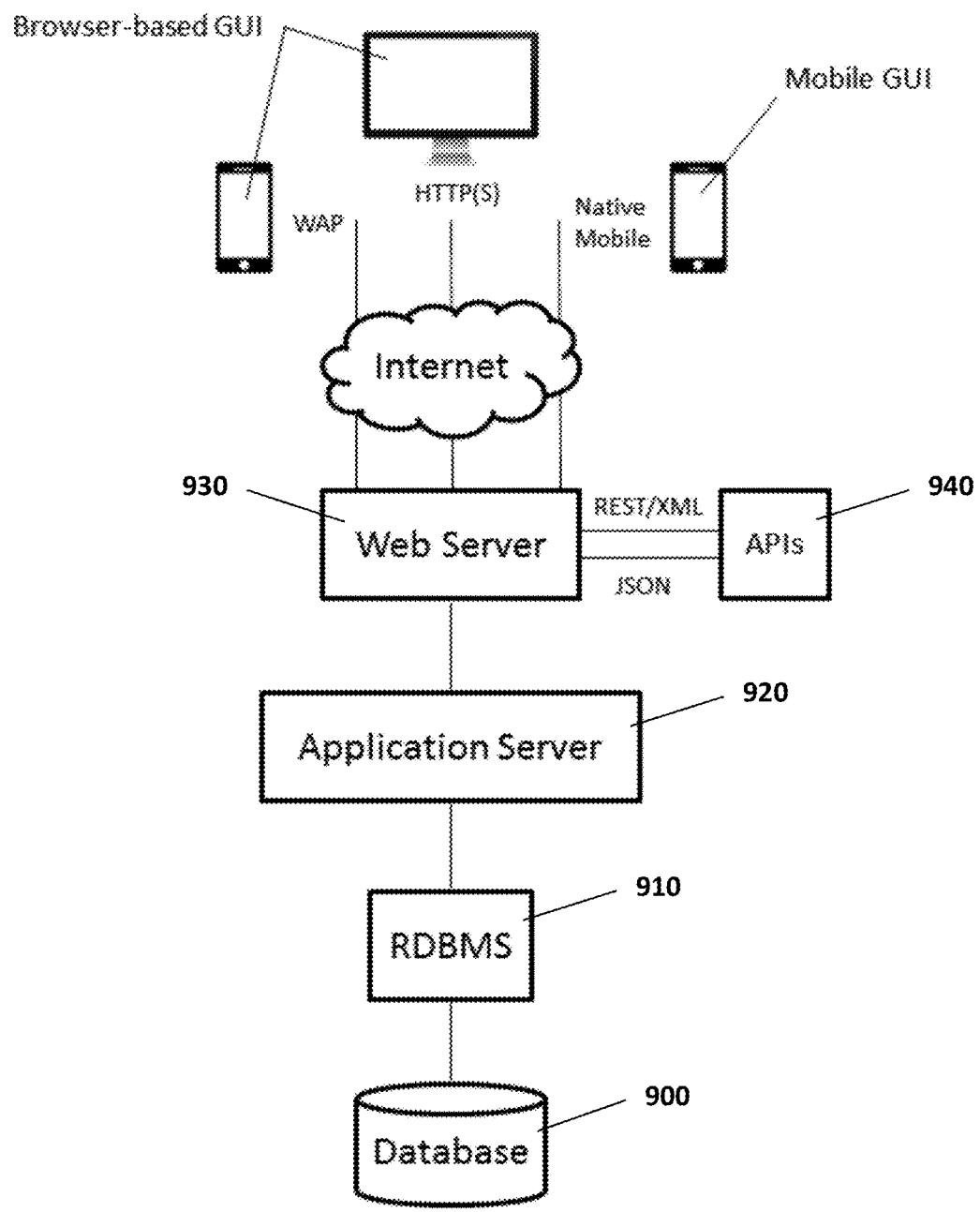
FIG. 9 shows a non-limiting schematic diagram of a web/mobile application provision system; in this case, a system providing browser-based and/or native mobile user interfaces.

Referring to FIG. 9, in a particular embodiment, an application provision system comprises one or more databases 900 accessed by a relational database management system (RDBMS) 910. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 920 (such as Java servers, .NET servers, PHP servers, and the like) and one or more web servers 930 (such as Apache, IIS, GWS and the like). The web server(s) optionally expose one or more web services via app application programming interfaces (APIs) 940. Via a network, such as the Internet, the system provides browser-based and/or mobile native user interfaces.

Figure 10:
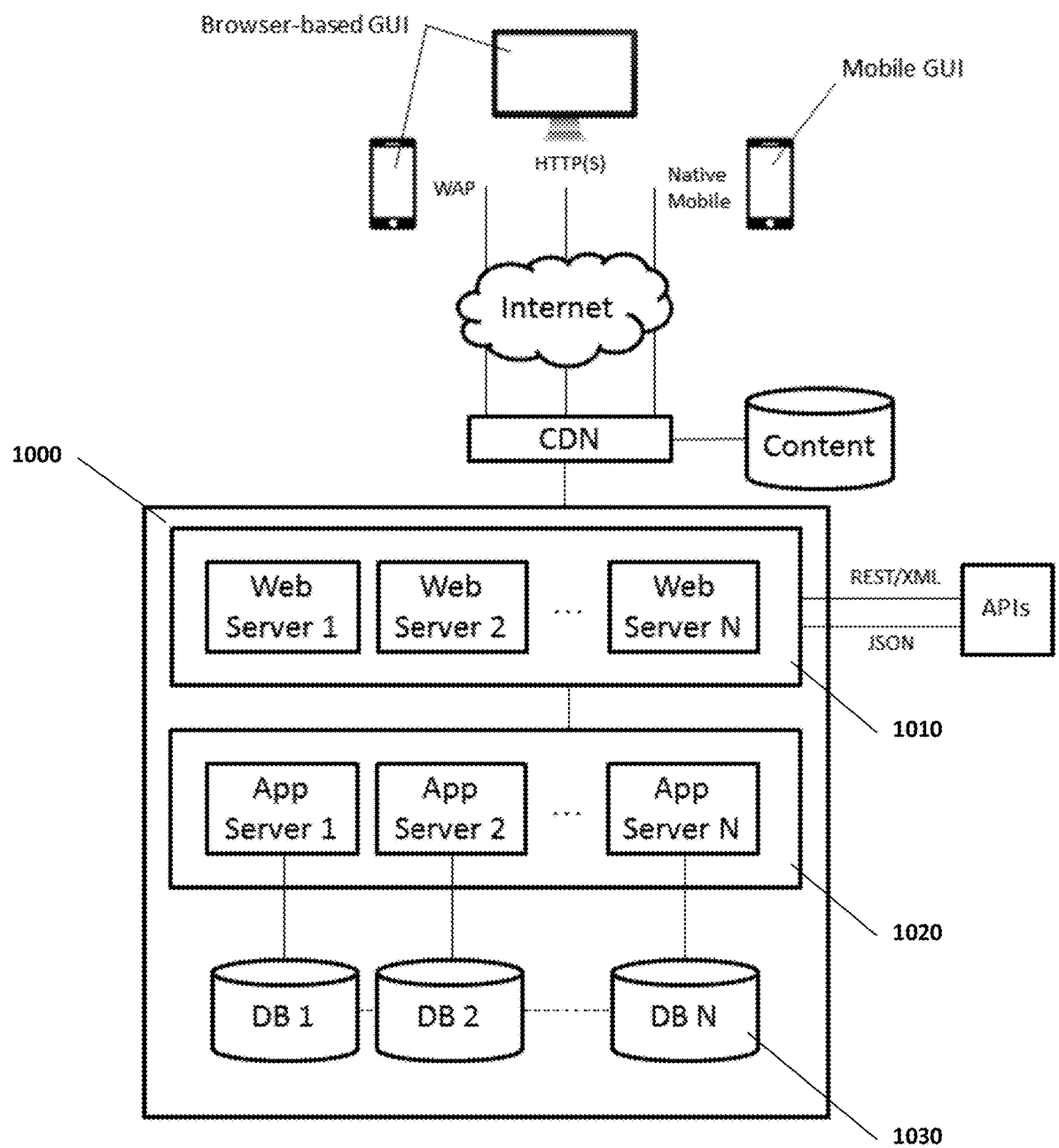
FIG. 10 shows a non-limiting schematic diagram of a cloud-based web/mobile application provision system; in this case, a system comprising an elastically load balanced, auto-scaling web server and application server resources as well synchronously replicated databases.

Referring to FIG. 10, in a particular embodiment, an application provision system alternatively has a distributed, cloud-based architecture 1000 and comprises elastically load balanced, auto-scaling web server resources 1010 and application server resources 1020 as well synchronously replicated databases 1030.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of spatial characteristics of a 3D object. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1—Authentication of a User

A user attempts to access a banking application on their mobile device. To grant access to the banking account of the user, the application prompts the user to position their mobile device such that the screen of the mobile device points towards their face.

The application then captures a first image data of the user, via the front-facing camera, while simultaneously displaying a first an authentication pattern image on the screen of the mobile device comprising a high brightness region and a low brightness region, that are arranged in two vertical bands. The application then captures a second image data of the user, via the front-facing camera, while simultaneously displaying a second authentication pattern image on the screen of the mobile device comprising a high brightness region and a low brightness region that are arranged in two horizontal bands. The application then captures a third image data of the user, via the front-facing camera, while simultaneously displaying a third authentication pattern image on the screen of the mobile device comprising two high brightness regions and two low brightness regions that are arranged in four alternating vertical bands. The application then captures a fourth image data of the user, via the front-facing camera, while simultaneously displaying a fourth authentication pattern image on the screen of the mobile device comprising two high brightness regions and two low brightness regions that are arranged in four alternating horizontal bands. The application then captures a fifth image data of the user, via the front-facing camera, while simultaneously displaying a fifth authentication pattern image on the screen of the mobile device comprising a plurality of high brightness regions and a plurality of low brightness regions that are arranged in alternating horizontal bands. The application then captures a sixth image data of the user, via the front-facing camera, while simultaneously displaying a sixth authentication pattern image on the screen of the mobile device comprising a plurality of high brightness regions and a plurality of low brightness regions that are arranged in alternating vertical bands. The application then captures a seventh image data of the user, via the front-facing camera, while simultaneously displaying a seventh authentication pattern image on the screen of the mobile device comprising two horizontal bands of high brightness regions across the top and bottom of the screen, and a single horizontal band of a low brightness region across the middle of the screen. The application then captures an eighth image data of the user, via the front-facing camera, while simultaneously displaying an eighth authentication pattern image on the screen of the mobile device comprising vertical bands of high brightness regions along the left and right sides of the screen, and a single vertical band of a low brightness region along the middle of the screen. The application then captures a ninth image data of the user, via the front-facing camera, while simultaneously displaying a ninth authentication pattern image on the screen of the mobile device comprising a plurality of randomly shaped and positioned, high brightness regions and low brightness regions. The application then further captures additional image data of the user, via the front-facing camera, while simultaneously displaying a video authentication pattern on the screen of the mobile device comprising a circular high brightness region moving clockwise in an elliptical pattern, with a background comprising a low brightness region.

Once the mobile device determines a current spatial characteristic of the user from the image data and the authentication patterns, the mobile device grants the user access to the banking account if no spoofing is detected, or blocks access to the banking account if spoofing is detected. The mobile device may transmit information related to the time, location, device, account, or any combination thereof, associated with the spoofing attempt, to an appropriate notification channel and/or database for further processing.

Example 2—Encoded Authentication Pattern

A user attempts to access a stock trading application on their mobile device. To grant access to the stock trading account of the user, the application prompts the user to position their mobile device such that the screen of the mobile device points towards their face. The application then captures image data of the user, via the front-facing camera, while simultaneously displaying a authentication pattern on the screen of the mobile device, wherein the authentication pattern comprises a plurality of images, wherein each image comprises a plurality of regions, wherein at least one of the regions varies in at least one of: brightness, position, size, shape, and color over time causing a variance of lighting effects which create highlights and shadows on the user over time, and wherein one image in the authentication pattern comprises an encoding image.

The encoding image comprises a region of bright red pixels on the left half of the screen of the mobile device, and a region of bright green pixels on the right half of the screen of the mobile device, which is unique to the user, the user's account, the time of the authentication attempt, the day of the authentication attempt, and the location of the user during the authentication attempt. The mobile device grants the user access to the stock trading account if red and green highlights and shadows on the user, captured by the 2D representation, correlate with the encoding image, or blocks access to the stock trading account if the 2D representation does not display red and green highlights and shadows on the user correlating with the encoding image. The mobile device then alerts an authority with information related to the time, location, device, account, or any combination thereof, associated with the attempted access.

What is claimed is:

1. A mobile device comprising: a front-facing camera, a front-facing screen, at least one processor, a memory, and a computer program including instructions executable by the at least one processor to run an application for recognizing a class or within-class identity of a 3D object in a mobile object detection and identity recognition process, the application comprising:
  a) a software module instructing a user to orient the front-facing camera of the mobile device in a fixed position and orientation relative to the object;
  b) a software module capturing, via the front-facing camera:
    i) a first image data of the 3D object while the mobile device is in the fixed position and orientation relative to the object, and while displaying, via the front-facing screen, a first identification pattern, the first identification pattern comprising a plurality of first identification pattern regions, wherein at least one of the first identification pattern regions varies from another first identification pattern region, the first identification pattern causing a first variance of lighting effects on the 3D object, which creates a first set of highlights and shadows on the 3D object, wherein the first image data comprises the first set of highlights and shadows, and
    ii) a second image data of the 3D object while the mobile device is in the fixed position and orientation relative to the object, and while displaying, via the front-facing screen, a second identification pattern after displaying the first identification pattern, wherein the second identification pattern is different from the first identification pattern, the second identification pattern comprising a plurality of second identification pattern regions, wherein at least one of the second identification pattern regions varies from another second identification pattern regions, the second identification pattern causing a second variance of lighting effects on the 3D object, which creates a second set of highlights and shadows on the 3D object, wherein the second image data comprises the second set of highlights and shadows;
  c) a software module calculating a difference between the first image data and the second image data to determine a current spatial characteristic of the 3D object; and
  d) a software module determining the class, or the within-class identity of the 3D object, in the mobile detection and identity recognition process by comparing the current spatial characteristic of the 3D object with a stored reference spatial characteristic of the 3D object.

2. The device of claim 1, wherein the 3D object comprises a face, a palm (palm print), a finger (fingerprint), or an ear.

3. The device of claim 1, wherein the mobile object detection and identity recognition process is performed solely or in combination with other processes of object detection and identity recognition.

4. The device of claim 1, wherein at least one of the first image data and the second image data comprises a plurality of photographs of the 3D object, a video of the 3D object, or both.

5. The device of claim 1, wherein at least one of the first identification pattern and the second identification pattern comprises a plurality of images, a video, or both.

6. The device of claim 1, wherein the at least one of the plurality of the first identification pattern regions and the plurality of the second identification pattern regions are arranged in two or more vertical or horizontal bands.

7. The device of claim 1, wherein the variation within at least one of the first identification pattern regions and the second identification pattern regions forms a regular pulse or a random pulse in the first or second identification pattern.

8. The device of claim 1, wherein the variation within at least one of the first identification pattern regions and the second identification pattern regions forms a translation or rotation of the first identification pattern region or the second identification pattern region in the first identification pattern or the second identification pattern, forms a contraction or expansion of the first identification pattern region or the second identification pattern region in the first identification pattern or the second identification pattern, or both.

9. The device of claim 1, wherein the variation within at least one of the first identification pattern regions and the second identification pattern regions encodes information in the first or second identification pattern.

10. A system for recognizing a class or within-class identity of a 3D object, in a mobile object detection and identity recognition process, the system comprising: a mobile device comprising a front-facing camera, a front-facing screen, at least one processor, a memory; and a server comprising at least one processor and a memory: the mobile device configured to:
  a) instruct a user to orient the front-facing camera of the mobile device in a fixed position and orientation relative to the object;
  b) capture, via the front-facing camera,
    i) a first image data of the 3D object while the mobile device is in the fixed position and orientation relative to the object, and while displaying, via the front-facing screen, a first identification pattern, the first identification pattern comprising a plurality of first identification pattern regions, wherein at least one of the first identification pattern regions varies from another first identification pattern region, the first identification pattern causing a first variance of lighting effects on the 3D object, which creates a first set of highlights and shadows on the 3D object, wherein the first image data comprises the first set of highlights and shadows, and
    ii) a second image data of the 3D object while the mobile device is in the fixed position and orientation relative to the object, and while displaying, via the front-facing screen, a second identification pattern after displaying the first identification pattern, wherein the second identification pattern is different from the first identification pattern, the second identification pattern comprising a plurality of second identification pattern regions, wherein at least one of the second identification pattern regions varies from another second identification pattern regions, the second identification pattern causing a second variance of lighting effects on the 3D object, which creates a second set of highlights and shadows on the 3D object, wherein the second image data comprises the second set of highlights and shadows;

transmit the first image data and the second image data to the server;

the server configured to:
a) receive the first image data and the second image data from the mobile device;
b) calculate a difference between the first image data and the second image data to determine a current spatial characteristic of the 3D object;
c) determine the class, or the within-class identity of the 3D object in the mobile object detection and identity recognition process by comparing the current spatial characteristic of the 3D object with a stored reference spatial characteristic of the 3D object; and
d) transmit the class, or the within-class identity to the mobile device.

11. The system of claim 10, wherein the 3D object comprises a face, a palm (palm print), a finger (fingerprint), or an ear.

12. The system of claim 10, wherein the mobile object detection and identity recognition process is performed solely or in combination with other processes of object detection and identity recognition.

13. The system of claim 10, wherein at least one of the first image data and the second image data comprises a plurality of photographs of the 3D object, a video of the 3D object, or both.

14. The system of claim 10, wherein at least one of the first identification pattern and the second identification pattern comprises a plurality of images, a video, or both.

15. The system of claim 10, wherein at least one of the plurality of first identification pattern regions and second identification pattern regions are arranged in two or more vertical or horizontal bands.

16. The system of claim 10, wherein the variation within at least one of the first identification pattern regions and the second identification pattern regions forms a regular pulse or a random pulse in the first or second identification pattern.

17. The system of claim 10, wherein the variation within at least one of the first identification pattern regions and the second identification pattern regions forms a translation or rotation of the first identification pattern region or the second identification pattern region in the first identification pattern or the second identification pattern, forms a contraction or expansion of the first identification pattern region or the second identification pattern region in the first identification pattern or the second identification pattern, or both.

18. The system of claim 10, wherein the variation within at least one of the first identification pattern regions and the second identification pattern regions encodes information in the first or second identification pattern.

19. A method of recognizing a class or within-class identity of a 3D object, in a mobile object detection and identity recognition process, the method comprising:
a) instructing a user to orient a front-facing camera of a mobile device in a fixed position and orientation relative to the 3D object;
b) capturing, via a front-facing camera of a mobile device,
i) a first image data of the 3D object while the mobile device is in the fixed position and orientation relative to the object, and while displaying, via the front-facing screen, a first identification pattern, the first identification pattern comprising a plurality of first identification pattern regions, wherein at least one of the first identification pattern regions varies from another first identification pattern region, the first identification pattern causing a first variance of lighting effects on the 3D object, which creates a first set of highlights and shadows on the 3D object, wherein the first image data comprises the first set of highlights and shadows, and
ii) a second image data of the 3D object while the mobile device is in the fixed position and orientation relative to the object, and while displaying, via the front-facing screen, a second identification pattern after displaying the first identification pattern, wherein the second identification pattern is different from the first identification pattern, the second identification pattern comprising a plurality of second identification pattern regions, wherein at least one of the second identification pattern regions varies from another second identification pattern regions, the second identification pattern causing a second variance of lighting effects on the 3D object, which creates a second set of highlights and shadows on the 3D object, wherein the second image data comprises the second set of highlights and shadows;
c) calculating a difference between the first image data and the second image data to determine a current spatial characteristic of the 3D object; and
d) determining the class, or the within-class identity of the 3D in the mobile object detection and identity recognition process by comparing the current spatial characteristic of the 3D object with a stored reference spatial characteristic of the 3D object.

* * * * *